(12) United States Patent
Ibrahim et al.

(10) Patent No.: US 12,301,321 B2
(45) Date of Patent: May 13, 2025

(54) REPORTING CONFIGURATION FOR CROSS LINK INTERFERENCE BASED CHANNEL STATE INFORMATION

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Huilin Xu, Temecula, CA (US); Seyedkianoush Hosseini, San Diego, CA (US); Ahmed Attia Abotabl, San Diego, CA (US); Krishna Kiran Mukkavilli, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 310 days.

(21) Appl. No.: 17/827,503

(22) Filed: May 27, 2022

(65) Prior Publication Data
US 2023/0387989 A1 Nov. 30, 2023

(51) Int. Cl.
*H04B 7/06* (2006.01)
*H04B 7/0452* (2017.01)
(Continued)

(52) U.S. Cl.
CPC ......... *H04B 7/0626* (2013.01); *H04B 7/0639* (2013.01); *H04B 17/345* (2015.01)

(58) Field of Classification Search
CPC .. H04B 7/0626; H04B 7/0639; H04B 17/345; H04B 7/0452; H04B 7/0456;
(Continued)

(56) References Cited

U.S. PATENT DOCUMENTS 9,332,554 B1 * 5/2016 Heidari .................. H04L 1/00
10,477,420 B2 * 11/2019 Ghosh ................. H04W 24/08
(Continued)

FOREIGN PATENT DOCUMENTS

| WO | WO-2020237628 A1 | 12/2020 |
| WO | WO-2021227080 A1 | 11/2021 |

OTHER PUBLICATIONS

International Search Report and Written Opinion—PCT/US2023/020352—ISA/EPO—Sep. 25, 2023.
(Continued)

*Primary Examiner* — Harry H Kim
(74) *Attorney, Agent, or Firm* — Holland & Hart LLP/Qualcomm Incorporated

(57) ABSTRACT

Methods, systems, and devices for wireless communications are described. A user equipment (UE) may transmit channel state information (CSI) that is based on a precoded cross link interference (CLI) channel at the UE. For example, a network entity may transmit a control message to a first UE that indicates a reporting configuration for indicating CSI associated with a channel between the first UE and the network entity. The first UE may generate the CSI based on a precoded CLI channel at the first UE associated with at least one uplink transmission associated with a second UE, where the precoded CLI channel is generated using at least one estimated CLI channel associated with the at least one uplink transmission and at least one candidate precoding matrix associated with the second UE. In accordance with the reporting configuration, the first UE may transmit the CSI to the network entity.

30 Claims, 22 Drawing Sheets

(51) Int. Cl.
*H04B 7/0456* (2017.01)
*H04B 17/345* (2015.01)

(58) Field of Classification Search
CPC .. H04B 7/063; H04B 7/0632; H04B 7/06954; H04B 7/06952
See application file for complete search history.

(56) References Cited

U.S. PATENT DOCUMENTS

| | | |
|---|---|---|
| 2014/0112377 A1* | 4/2014 | Chiu ................. H04L 7/0079 375/219 |
| 2020/0228212 A1* | 7/2020 | Xu ..................... H04L 27/2602 |
| 2022/0190995 A1* | 6/2022 | Zhou .................. H04B 7/0413 |
| 2023/0179278 A1* | 6/2023 | Zhou .................. H04B 7/0639 370/329 |
| 2023/0387990 A1 | 11/2023 | Ibrahim et al. |
| 2023/0388837 A1 | 11/2023 | Ibrahim et al. |
| 2024/0007206 A1* | 1/2024 | Alriksson ............ H04B 7/0626 |

OTHER PUBLICATIONS

Partial International Search Report—PCT/US2023/020352—ISA/EPO—Aug. 4, 2023.

\* cited by examiner

REPORTING CONFIGURATION FOR CROSS LINK INTERFERENCE BASED CHANNEL STATE INFORMATION

FIELD OF TECHNOLOGY

The following relates to wireless communications, including reporting configuration for cross link interference (CLI) based channel state information (CSI).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications systems may support full duplex communications between communication devices. Full duplex communications may result in cross link interference (CLI) at one or more of the communication devices, which may degrade signal quality and reliability of the full duplex communications.

SUMMARY

The described techniques relate to improved methods, systems, devices, and apparatuses that support reporting configuration for cross link interference (CLI) based channel state information (CSI). For example, the described techniques support the consideration of the impact of cross link interference (CLI) in generating and reporting channel state information (CSI). For instance, a first UE may receive a control message from a network entity that indicates a reporting configuration for indicating CSI that is based on estimated CLI (e.g., a precoded CLI channel) between the first UE and a second UE. For example, the first UE may receive a CLI-reference signal (CLI-RS) from the second UE that enables the first UE to estimate a CLI channel between the first UE and the second UE. The first UE may also receive a CSI-reference signal (CSI-RS) from the network entity to enable the first UE to estimate a channel between the first UE and the network entity. Based on the estimated CLI channel and a candidate precoding matrix associated with uplink precoding at the second UE, the first UE may estimate (e.g., predict) a CLI at the first UE (e.g., a precoded CLI channel between the first UE and the second UE) if the second UE were to transmit an uplink message in accordance with the candidate precoding matrix. The first UE may generate CSI based on measurements of the CSI-RS and the estimated CLI and may transmit the CSI to the network entity in accordance with the reporting configuration.

A method for wireless communication at a first UE is described. The method may include receiving a control message that indicates a reporting configuration for indicating CSI, where the CSI is associated with a channel between the first UE and a network entity, generating the CSI based on at least one precoded CLI channel at the first UE associated with at least one uplink transmission associated with a second UE, the at least one precoded CLI channel generated using at least one estimated CLI channel associated with the at least one uplink transmission and at least one candidate precoding matrix of one or more candidate precoding matrices associated with the second UE, and transmitting the CSI in accordance with the reporting configuration.

An apparatus for wireless communication is described. The apparatus may include memory, a transceiver, and at least one processor of a UE. The at least one processor may be coupled with the memory and the transceiver, and configured to receive a control message that indicates a reporting configuration for indicating CSI, where the CSI is associated with a channel between the first UE and a network entity, generate the CSI based on at least one precoded CLI channel at the first UE associated with at least one uplink transmission associated with a second UE, the at least one precoded CLI channel generated using at least one estimated CLI channel associated with the at least one uplink transmission and at least one candidate precoding matrix of one or more candidate precoding matrices associated with the second UE, and transmit the CSI in accordance with the reporting configuration.

Another apparatus for wireless communication at a first UE is described. The apparatus may include means for receiving a control message that indicates a reporting configuration for indicating CSI, where the CSI is associated with a channel between the first UE and a network entity, means for generating the CSI based on at least one precoded CLI channel at the first UE associated with at least one uplink transmission associated with a second UE, the at least one precoded CLI channel generated using at least one estimated CLI channel associated with the at least one uplink transmission and at least one candidate precoding matrix of one or more candidate precoding matrices associated with the second UE, and means for transmitting the CSI in accordance with the reporting configuration.

A non-transitory computer-readable medium storing code for wireless communication at a first UE is described. The code may include instructions executable by a processor to receive a control message that indicates a reporting configuration for indicating CSI, where the CSI is associated with a channel between the first UE and a network entity, generate the CSI based on at least one precoded CLI channel at the first UE associated with at least one uplink transmission associated with a second UE, the at least one precoded CLI channel generated using at least one estimated CLI channel associated with the at least one uplink transmission and at least one candidate precoding matrix of one or more candidate precoding matrices associated with the second UE, and transmit the CSI in accordance with the reporting configuration.

In some examples of the method, apparatuses, and non-transitory computer-readable medium described herein, transmitting the CSI may include operations, features, means, or instructions for transmitting a report including the CSI, the report including an indication of the at least one candidate precoding matrix.

In some examples of the method, apparatuses, and non-transitory computer-readable medium described herein, generating the CSI may include operations, features, means, or instructions for generating the CSI based on the at least one candidate precoding matrix, where the at least one candidate precoding matrix corresponds to a first candidate precoding matrix of the one or more candidate precoding matrices that may be associated with a minimum estimated CLI at the first UE relative to CLIs at the first UE that may be estimated based on other candidate precoding matrices of the one or more candidate precoding matrices.

In some examples of the method, apparatuses, and non-transitory computer-readable medium described herein, generating the CSI may include operations, features, means, or instructions for generating the CSI based on the at least one candidate precoding matrix, where the at least one candidate precoding matrix corresponds to a first candidate precoding matrix of the one or more candidate precoding matrices that may be associated with a maximum estimated CLI at the first UE relative to CLIs at the first UE that may be estimated based on other candidate precoding matrices of the one or more candidate precoding matrices.

In some examples of the method, apparatuses, and non-transitory computer-readable medium described herein, transmitting the report may include operations, features, means, or instructions for transmitting the report having a payload whose size may be based on including the indication of the at least one candidate precoding matrix.

In some examples of the method, apparatuses, and non-transitory computer-readable medium described herein, transmitting the report may include operations, features, means, or instructions for transmitting the indication of the at least one candidate precoding matrix in a field of the report that may be associated with reporting one or more types of CSI.

Some examples of the method, apparatuses, and non-transitory computer-readable medium described herein may further include operations, features, means, or instructions for generating a set of precoded CLI channels, each precoded CLI channel generated based on an estimated CLI channel of a set of CLI channels at the first UE corresponding to a set of uplink transmissions associated with the second UE and based on a candidate precoding matrix of the one or more candidate precoding matrices, where generating the CSI includes, generating the CSI based on an average of the set of precoded CLI channels, and generating CSI associated with a precoded CLI channel associated with a minimum interference with the channel between the first UE and the network entity based on the set of precoded CLI channels.

Some examples of the method, apparatuses, and non-transitory computer-readable medium described herein may further include operations, features, means, or instructions for generating a set of precoded CLI channels, each precoded CLI channel generated based on a single estimated CLI channel at the first UE corresponding to a single uplink transmission associated with the second UE and based on a set of candidate precoding matrices of the one or more candidate precoding matrices, where generating the CSI includes, generating the CSI based on an average of the set of precoded CLI channels, and generating CSI associated with a precoded CLI channel associated with a minimum interference with the channel between the first UE and the network entity based on the set of precoded CLI channels.

In some examples of the method, apparatuses, and non-transitory computer-readable medium described herein, the control message indicates the one or more candidate precoding matrices associated with uplink precoding at the second UE.

In some examples of the method, apparatuses, and non-transitory computer-readable medium described herein, the control message indicates a first subset of candidate precoding matrices of a set of candidate precoding matrices to exclude in estimating CLI at the first UE and the one or more candidate precoding matrices correspond to non-excluded candidate precoding matrices of the set of candidate precoding matrices.

Some examples of the method, apparatuses, and non-transitory computer-readable medium described herein may further include operations, features, means, or instructions for receiving a second control message that indicates the one or more candidate precoding matrices associated with uplink precoding at the second UE.

In some examples of the method, apparatuses, and non-transitory computer-readable medium described herein, transmitting the CSI may include operations, features, means, or instructions for transmitting a report including the CSI, the report including an indication of a set of candidate precoding matrices unused by the first UE to generate the at least one precoded CLI channel at the first UE in association with generating the CSI.

In some examples of the method, apparatuses, and non-transitory computer-readable medium described herein, the set of candidate precoding matrices corresponds to non-preferred precoding matrices for the second UE to use in precoding the uplink transmission.

In some examples of the method, apparatuses, and non-transitory computer-readable medium described herein, the reporting configuration indicates a field in the report including the indication of the set of candidate precoding matrices unused by the first UE.

In some examples of the method, apparatuses, and non-transitory computer-readable medium described herein, the reporting configuration includes an indication that reporting of the set of candidate precoding matrices unused by the first UE may be activated.

Some examples of the method, apparatuses, and non-transitory computer-readable medium described herein may further include operations, features, means, or instructions for transmitting an uplink MAC-CE that indicates a set of candidate precoding matrices unused by the first UE to generate the at least one precoded CLI channel at the first UE in association with generating the CSI.

In some examples of the method, apparatuses, and non-transitory computer-readable medium described herein, the uplink MAC-CE indicates a set of multiple sets of candidate precoding matrices unused by the first UE to generate the at least one precoded CLI channel at the first UE in association with generating respective CSI, each set of candidate of precoding matrices of the set of multiple sets of candidate precoding matrices corresponding to a respective report including the respective CSI.

In some examples of the method, apparatuses, and non-transitory computer-readable medium described herein, the uplink MAC-CE indicates a respective identifier of each respective report.

In some examples of the method, apparatuses, and non-transitory computer-readable medium described herein, the at least one precoded CLI channel at the first UE corresponds to predicted CLI at the first UE if the second UE transmits the uplink transmission using the at least one candidate precoding matrix.

A method for wireless communication at a network entity is described. The method may include outputting a control message that indicates a reporting configuration for indicating CSI, where the CSI is associated with a channel between a first UE and the network entity and obtaining the CSI in accordance with the reporting configuration, where the CSI is based on at least one candidate precoding matrix of one or more candidate precoding matrices associated with uplink precoding at a second UE and at least one precoded CLI channel at the first UE associated with an uplink transmission associated with the second UE.

An apparatus for wireless communication is described. The apparatus may include memory and at least one processor of a network entity. The at least one processor may be coupled with the memory, and configured to output a control message that indicates a reporting configuration for indicating CSI, where the CSI is associated with a channel between a first UE and the network entity and obtain the CSI in accordance with the reporting configuration, where the CSI is based on at least one candidate precoding matrix of one or more candidate precoding matrices associated with uplink precoding at a second UE and at least one precoded CLI channel at the first UE associated with an uplink transmission associated with the second UE.

Another apparatus for wireless communication at a network entity is described. The apparatus may include means for outputting a control message that indicates a reporting configuration for indicating CSI, where the CSI is associated with a channel between a first UE and the network entity and means for obtaining the CSI in accordance with the reporting configuration, where the CSI is based on at least one candidate precoding matrix of one or more candidate precoding matrices associated with uplink precoding at a second UE and at least one precoded CLI channel at the first UE associated with an uplink transmission associated with the second UE.

A non-transitory computer-readable medium storing code for wireless communication at a network entity is described. The code may include instructions executable by a processor to output a control message that indicates a reporting configuration for indicating CSI, where the CSI is associated with a channel between a first UE and the network entity and obtain the CSI in accordance with the reporting configuration, where the CSI is based on at least one candidate precoding matrix of one or more candidate precoding matrices associated with uplink precoding at a second UE and at least one precoded CLI channel at the first UE associated with an uplink transmission associated with the second UE.

Some examples of the method, apparatuses, and non-transitory computer-readable medium described herein may further include operations, features, means, or instructions for outputting a second control message that includes a TPMI for the uplink transmission associated with the second UE, the TPMI based on the CSI and obtaining the uplink transmission associated with the second UE in accordance with the TPMI.

In some examples of the method, apparatuses, and non-transitory computer-readable medium described herein, obtaining the CSI may include operations, features, means, or instructions for obtaining a report including the CSI, the report including an indication of the at least one candidate precoding matrix.

In some examples of the method, apparatuses, and non-transitory computer-readable medium described herein, the candidate precoding matrix corresponds to a first candidate precoding matrix of the one or more candidate precoding matrices that may be associated with a minimum estimated CLI at the first UE relative to CLIs at the first UE estimated based on other candidate precoding matrices of the one or more candidate precoding matrices.

In some examples of the method, apparatuses, and non-transitory computer-readable medium described herein, the candidate precoding matrix corresponds to a first candidate precoding matrix of the one or more candidate precoding matrices that may be associated with a maximum estimated CLI at the first UE relative to CLIs at the first UE estimated based on other candidate precoding matrices of the one or more candidate precoding matrices.

In some examples of the method, apparatuses, and non-transitory computer-readable medium described herein, the control message indicates the one or more candidate precoding matrices associated with uplink precoding at the second UE.

In some examples of the method, apparatuses, and non-transitory computer-readable medium described herein, the control message indicates a first subset of candidate precoding matrices of a set of candidate precoding matrices to exclude in estimating CLI at the first UE and the one or more candidate precoding matrices correspond to non-excluded candidate precoding matrices of the set of candidate precoding matrices.

Some examples of the method, apparatuses, and non-transitory computer-readable medium described herein may further include operations, features, means, or instructions for outputting a second control message that indicates the one or more candidate precoding matrices associated with uplink precoding at the second UE.

In some examples of the method, apparatuses, and non-transitory computer-readable medium described herein, obtaining the CSI may include operations, features, means, or instructions for obtaining a report including the CSI, the report including an indication of a set of candidate precoding matrices unused by the first UE to generate the at least one precoded CLI channel at the first UE in association with generating the CSI.

DETAILED DESCRIPTION

Figure 1:
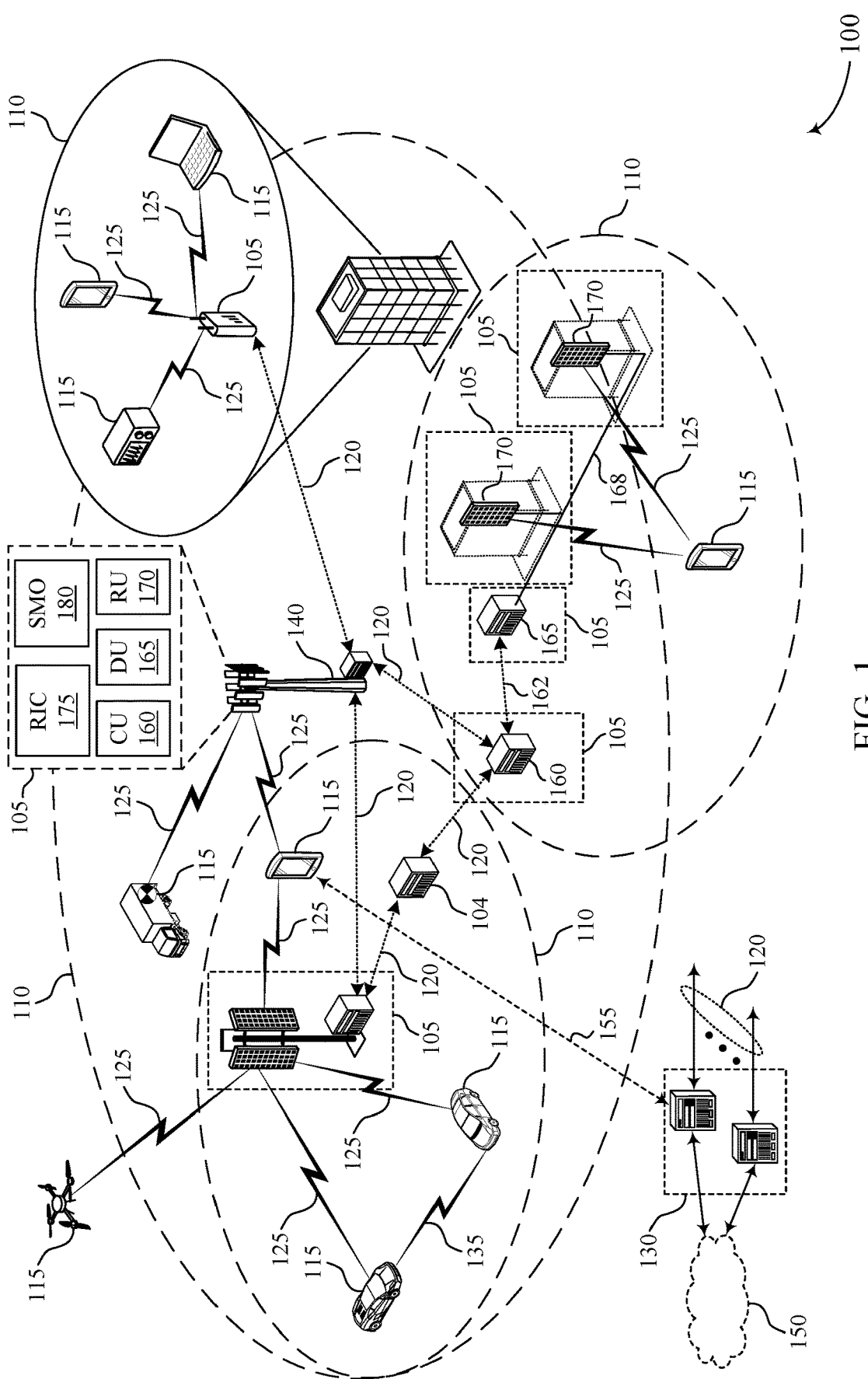
FIG. 1 illustrates an example of a wireless communications system that supports reporting configurations for cross link interference (CLI) based channel state information (CSI) in accordance with one or more aspects of the present disclosure.

Some wireless communications systems may support full duplex communications in which downlink messages and uplink messages are concurrently communicated in time (e.g., simultaneously communicated in time, communicated via fully or partially overlapping time resources). For example, a network entity, such as a base station, may concurrently transmit a downlink message to a first user equipment (UE) and receive an uplink message from a second UE, among other examples of full duplex communications. In some cases, full duplex communications may result in cross link interference (CLI) at one or more communication devices. For example, CLI may refer to interference between concurrently communicated uplink and downlink messages, where the uplink message is transmitted by a different communication device than a communication device to which the downlink message is transmitted, or vice versa. For instance, if a first UE (e.g., a victim UE) receives a downlink message from a network entity concurrent with a second UE (e.g., an aggressor UE) transmitting an uplink message to the network entity (e.g., or another network entity), the uplink message may interfere with the downlink message at the first UE such that a reliability (e.g., signal quality) of the downlink message received by the first UE is reduced. Such interference may be an example of CLI. Accordingly, techniques for reducing or mitigating CLI may be desired.

Techniques, systems, and devices are described herein for enhanced channel state feedback reporting in which a UE may report channel state information (CSI) that is based on estimated inter-UE CLI. For example, a first UE may receive a control message from a network entity that indicates a reporting configuration for indicating CSI that is based on estimated CLI (e.g., a precoded CLI channel) between the first UE and a second UE. For example, the first UE may receive a CLI-reference signal (CLI-RS), which the first UE may measure and use to estimate a CLI channel between the first UE and the second UE based on measurements of the CLI-RS. The first UE may also receive a CSI-reference signal (CSI-RS) from the network entity, which the first UE may measure and use to estimate a channel between the first UE and the network entity based on measurements of the CSI-RS.

The network entity may indicate to the first UE (e.g., via the reporting configuration, via downlink control information (DCI)) one or more candidate precoding matrices associated with uplink precoding at the second UE that the first UE may use in generating CSI. For example, based on the estimated CLI channel and a candidate precoding matrix, the first UE may estimate (e.g., predict) a CLI at the first UE if the second UE were to transmit an uplink message in accordance with the candidate precoding matrix. The first UE may generate CSI based on measurements of the CSI-RS and the estimated CLI and may transmit the CSI to the network entity in accordance with the reporting configuration.

By reporting CSI to a network entity that is based on estimated CLI, parameters associated with full duplex communications may be configured (e.g., selected, adjusted, indicated) to reduce the impact of CLI on the full duplex communications. For instance, based on the CSI reported by the first UE, the network entity (e.g., or another network entity) may transmit a transmission precoding matrix indicator (TPMI) to the second UE that indicates a precoding matrix for the second UE to use in transmitting an uplink message to the network entity such that CLI associated with the uplink message may be reduced or mitigated. As a result, a reliability (e.g., signal quality) of a downlink message that is received at the first UE concurrent with the transmission of the uplink message (e.g., a full duplex downlink message) may be increased based on the CLI reduction. Additionally or alternatively, the network entity may transmit the full duplex downlink message such that the impact of CLI is reduced, for example, by transmitting the full duplex downlink message using an increased transmission power, precoding parameters, or beamforming weights, among other communication parameters, such that the reliability of the full duplex downlink message is increased. Additionally or alternatively, the network entity may schedule (e.g., reschedule) the uplink message or the downlink message such that they are not concurrently communicated, thereby eliminating By increasing downlink message reliability, full duplex communication reliability may be increased, which may result in increased data rates, increased spectral efficiency, increased capacity, and reduced latency, for example, due to more reliably supporting concurrent communication of uplink and downlink messages, supporting communications using higher coding rates or higher level modulation schemes, or both. Additionally, increased downlink message and full duplex communication reliability may result in reduced message failures, which may reduce retransmissions or other signaling associated with message failures, thereby increasing communication resource efficiency, reducing power consumption, reducing processing, increasing battery life, and increasing coordination between communication devices, among other benefits.

Aspects of the disclosure are initially described in the context of wireless communications systems and a network architecture. Aspects of the disclosure are additionally described in the context of a process flow, a configuration diagram, and report diagrams. Aspects of the disclosure are further illustrated by and described with reference to apparatus diagrams, system diagrams, and flowcharts that relate to reporting configurations for CLI based CSI.

FIG. 1 illustrates an example of a wireless communications system 100 that supports reporting configurations for CLI based CSI in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) via which the UEs 115 and the network entity 105 may establish one or more communication links 125. The coverage area 110 may be an example of a geographic area via which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support reporting configurations for CLI based CSI as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) via one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications via a particular carrier bandwidth or may be configurable to support communications via one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating via portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., via a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) via which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The wireless communications system 100 may support the communication of CSI between communication devices. For example, communication devices (e.g., network entities 105, UEs 115) may exchange CSI (e.g., a network entity 105 may gather CSI from a UE 115, UEs 115 may exchange CSI) to efficiently configure and schedule the channel. In some examples, this information may be sent from a UE 115 in the form of a CSI report. A CSI report may contain: a rank indicator (RI) requesting a quantity of layers (e.g., spatial layers) to be used for transmissions (e.g., based on antenna ports of the UE 115); a layer indicator (LI) indicating a strongest layer of the quantity of layers requested by the RI; a precoding matrix indicator (PMI) indicating a preference for which precoder matrix should be used (e.g., based on a quantity of layers); a channel quality indicator (CQI) representing a highest order modulation scheme that may be used; a CSI-RS resource indicator (CRI) indicating a preferred beam for communicating with a communication device (e.g., a network entity 105, another UE 115); a synchronization signal block (SSB) resource indicator (SSBRI) indicating an SSB that the UE 115 receives with a highest received power (e.g., reference signal received power (RSRP), or a combination thereof, among other examples of CSI that may be included in a CSI report.

In some cases, an RI may be associated with a quantity of antennas used by a device. CQI may be calculated by a UE 115 in response to receiving predetermined pilot symbols such as CRSs or CSI-RSs. RI and PMI may be excluded if the UE 115 does not support spatial multiplexing (or is not in a supported spatial mode). In some examples, the types of information included in the CSI report may determine a reporting type (e.g., a type I CSI report, a type II CSI report, among other CSI report types). In some examples, a CSI report may be periodic, aperiodic, or semi-persistent.

Based on gathered CSI, a network entity 105 may indicate various parameters for a UE 115 to use in transmitting uplink messages to the network entity 105. For example, a network entity 105 may transmit a TPMI to a UE 115 that indicates a precoding matrix for the UE 115 to use in precoding and transmitting an uplink message to the network entity 105. In some examples, the TPMI may correspond to a PMI reported by the UE 115. In some examples, the TPMI may indicate a different precoding matrix than a precoding matrix indicated by a reported PMI. In some examples, the network entity 105 may indicate the precoding matrix by indicating an index of the TPMI. For example, the UE 115 may be configured with or otherwise store various precoding matrices corresponding to various TPMI indexes. Table 1 below illustrates an example of a set of precoding matrices W with which the UE 115 may be configured or otherwise store, where the precoding matrices are for single-layer transmissions using four antenna ports with transform precoding disabled.

TABLE 1

| TPMI Index | W (ordered from left to right in increasing order of TPMI index) | | | |
|---|---|---|---|---|
| 0-7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ |
| | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ |
| | $\frac{1}{2}\begin{bmatrix}1\\1\\1\\1\end{bmatrix}$ | $\frac{1}{2}\begin{bmatrix}1\\1\\j\\j\end{bmatrix}$ | $\frac{1}{2}\begin{bmatrix}1\\1\\-1\\-1\end{bmatrix}$ | $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ | $\frac{1}{2}\begin{bmatrix}1\\j\\j\\-1\end{bmatrix}$ | $\frac{1}{2}\begin{bmatrix}1\\j\\-1\\-j\end{bmatrix}$ | $\frac{1}{2}\begin{bmatrix}1\\j\\-j\\1\end{bmatrix}$ |
| | $\frac{1}{2}\begin{bmatrix}1\\-1\\1\\-1\end{bmatrix}$ | $\frac{1}{2}\begin{bmatrix}1\\-1\\j\\-j\end{bmatrix}$ | $\frac{1}{2}\begin{bmatrix}1\\-1\\-1\\1\end{bmatrix}$ | $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ | $\frac{1}{2}\begin{bmatrix}1\\-j\\j\\1\end{bmatrix}$ | $\frac{1}{2}\begin{bmatrix}1\\-j\\-1\\j\end{bmatrix}$ | $\frac{1}{2}\begin{bmatrix}1\\-j\\-j\\-1\end{bmatrix}$ |

Accordingly, the network entity 105 may indicate a precoding matrix W to the UE 115 by transmitting a TPMI that includes a TPMI index, for example, of a table of TPMI indexes, where each table of TPMI indexes corresponds to transmissions using various combinations of antenna ports and spatial layers.

Additionally or alternatively, the network entity may transmit a transmission rank indicator (TRI) to a UE 115 that indicates a rank according to which the UE 115 is transmit an uplink message to the network entity 105 (e.g., a quantity of spatial layers that the UE 115 is to use). In some examples, the TRI may correspond to an RI reported by the UE 115. In some examples, the TRI may indicate a different quantity of spatial layers than a quantity of spatial layers indicated by a reported RI.

The wireless communications system 100 may support full duplex communications (e.g., a mode that supports two-way communication via concurrent transmission and reception) between communication devices. For example, a network entity 105 may concurrently transmit a downlink message to a first UE 115 and receive an uplink message from a second UE 115. Additionally or alternatively, a network entity 105 and a UE 115 may concurrently communicate a downlink message and an uplink message with each other. Additionally or alternatively, a UE 115 may concurrently receive a downlink message from a first network entity 105 and transmit an uplink message to a second network entity 105. Other examples of full duplex communications between communication devices may be supported.

In some cases, CLI may be associated with full duplex communications. For example, because full duplex communications are communicated concurrently in time, a full duplex downlink message may interfere with a full duplex uplink message, or vice versa. Inter-UE CLI may refer to the CLI caused by an uplink message transmitted by a first UE 115 interfering with a downlink message concurrently received at a second UE 115. Inter-gNB CLI may refer to the CLI caused by a downlink message transmitted by a first base station 140 interfering with an uplink message concurrently received at a second base station 140. CLI may degrade a reliability or signal quality of full duplex communications. Accordingly, techniques for mitigating the impact of CLI on full duplex communication reliability may be desired.

Various aspects of the described techniques support reporting CSI that is based on estimated inter-UE CLI and such aspects may be implemented by wireless communications system 100. For example, a first UE 115 may report CSI to a network entity 105 that is based on estimated (e.g., predicted) CLI at the first UE 115 that is caused by a second UE 115. To support such CLI based CSI reporting, the network entity 105 may transmit a control message to the first UE 115 that indicates a reporting configuration for the CLI based CSI that includes various parameters for generating and reporting the CLI based CSI. The network entity 105 may indicate, via the reporting configuration or another control message, one or more candidate precoding matrices to consider (e.g., or exclude from consideration) in generating the CLI based CSI. For example, the first UE 115 may use one or more of the candidate precoding matrices (e.g., or one or more non-excluded candidate precoding matrices) to estimate the CLI at the first UE 115 if the second UE 115 were to transmit an uplink message using the one or more precoding matrices.

The estimated CLI may impact channel conditions between the first UE 115 and the network entity 105. Accordingly, the first UE 115 may estimate a channel between the first UE 115 and the network entity 105 based on the estimated CLI in addition to a CSI-RS received from the network entity 105 (e.g., rather than considering only the CSI-RS). As such, the first UE 115 may generate and report CSI in accordance with the reporting configuration based on a channel estimate that considers the impact of potential CLI caused by the second UE 115. As a result, communication parameters (e.g., precoding parameters, ranks, beamforming parameters, transmission powers, modulation schemes, time resources, frequency resources, or a combination thereof, among others) may be selected to reduce CLI impact, thereby increasing full duplex communication reliability.

Figure 2:
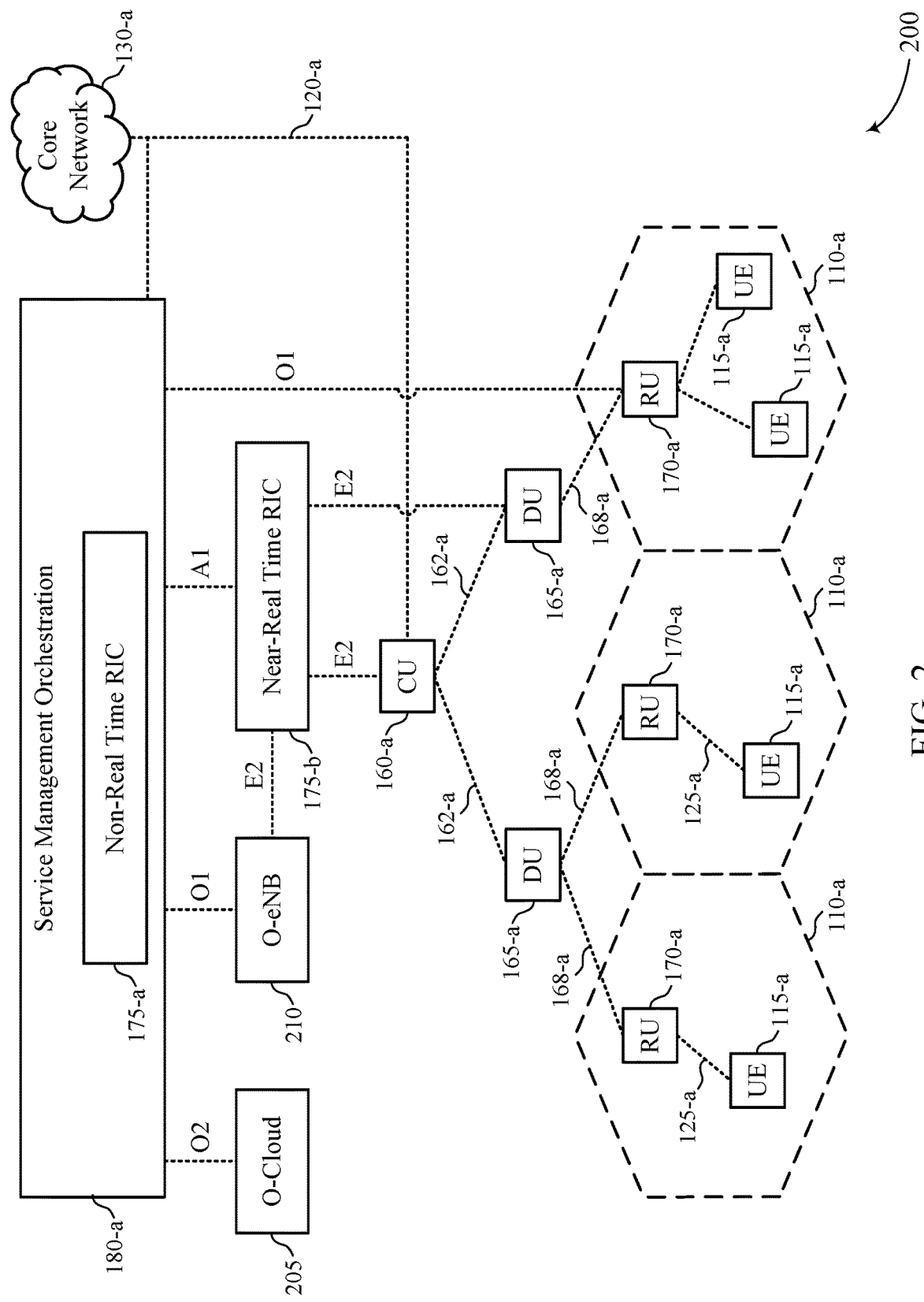
FIG. 2 illustrates an example of a network architecture that supports reporting configurations for CLI based CSI in accordance with one or more aspects of the present disclosure.

FIG. 2 illustrates an example of a network architecture 200 (e.g., a disaggregated base station architecture, a disaggregated RAN architecture) that supports reporting configurations for CLI based CSI in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals via a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, via a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-a may further host one or more low PHY layers. Each layer may be implemented with an interface configured to communicate signals with other layers hosted by the DU 165-a, or with control functions hosted by a CU 160-a.

In some examples, lower-layer functionality may be implemented by one or more RUs 170-a. For example, an RU 170-a, controlled by a DU 165-a, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-a may be implemented to handle over the air (OTA) communication with one or more UEs 115-a. In some implementations, real-time and non-real-time aspects of control and user plane communication with the RU(s) 170-a may be controlled by the corresponding DU 165-a. In some examples, such a configuration may enable a DU 165-a and a CU 160-a to be implemented in a cloud-based RAN architecture, such as a vRAN architecture.

The SMO 180-a may be configured to support RAN deployment and provisioning of non-virtualized and virtualized network entities 105. For non-virtualized network entities 105, the SMO 180-a may be configured to support the deployment of dedicated physical resources for RAN coverage requirements which may be managed via an operations and maintenance interface (e.g., an O1 interface). For virtualized network entities 105, the SMO 180-a may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-a, DUs 165-a, RUs 170-a, and Near-RT RICs 175-b. In some implementations, the SMO 180-a may communicate with components configured in accordance with a 4G RAN (e.g., via an O1 interface). Additionally, or alternatively, in some implementations, the SMO 180-a may communicate directly with one or more RUs 170-a via an O1 interface. The SMO 180-a also may include a Non-RT RIC 175-a configured to support functionality of the SMO 180-a.

The Non-RT RIC 175-a may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-b. The Non-RT RIC 175-a may be coupled to or communicate with (e.g., via an Al interface) the Near-RT RIC 175-b. The Near-RT RIC 175-b may be configured to include a logical function that enables near-real-time control and optimization of RAN elements and resources via data collection and actions via an interface (e.g., via an E2 interface) connecting one or more CUs 160-a, one or more DUs 165-a, or both, as well as an O-eNB 210, with the Near-RT RIC 175-b.

In some examples, to generate AI/ML models to be deployed in the Near-RT RIC 175-b, the Non-RT RIC 175-a may receive parameters or external enrichment information from external servers. Such information may be utilized by the Near-RT RIC 175-b and may be received at the SMO 180-a or the Non-RT RIC 175-a from non-network data sources or from network functions. In some examples, the Non-RT RIC 175-a or the Near-RT RIC 175-b may be configured to tune RAN behavior or performance. For example, the Non-RT RIC 175-a may monitor long-term trends and patterns for performance and employ AI or ML models to perform corrective actions through the SMO 180-a (e.g., reconfiguration via O1) or via generation of RAN management policies (e.g., A1 policies).

In accordance with examples described herein, a UE 115-a may report CSI that is based on estimated inter-UE CLI in accordance with a reporting configuration for the CLI based CSI. For example, a UE 115-a may transmit a report (e.g., a CSI report) to an RU 170-a that includes CSI that is generated based on estimated CLI between two UEs 115-a in accordance with examples as described herein.

Figure 3:
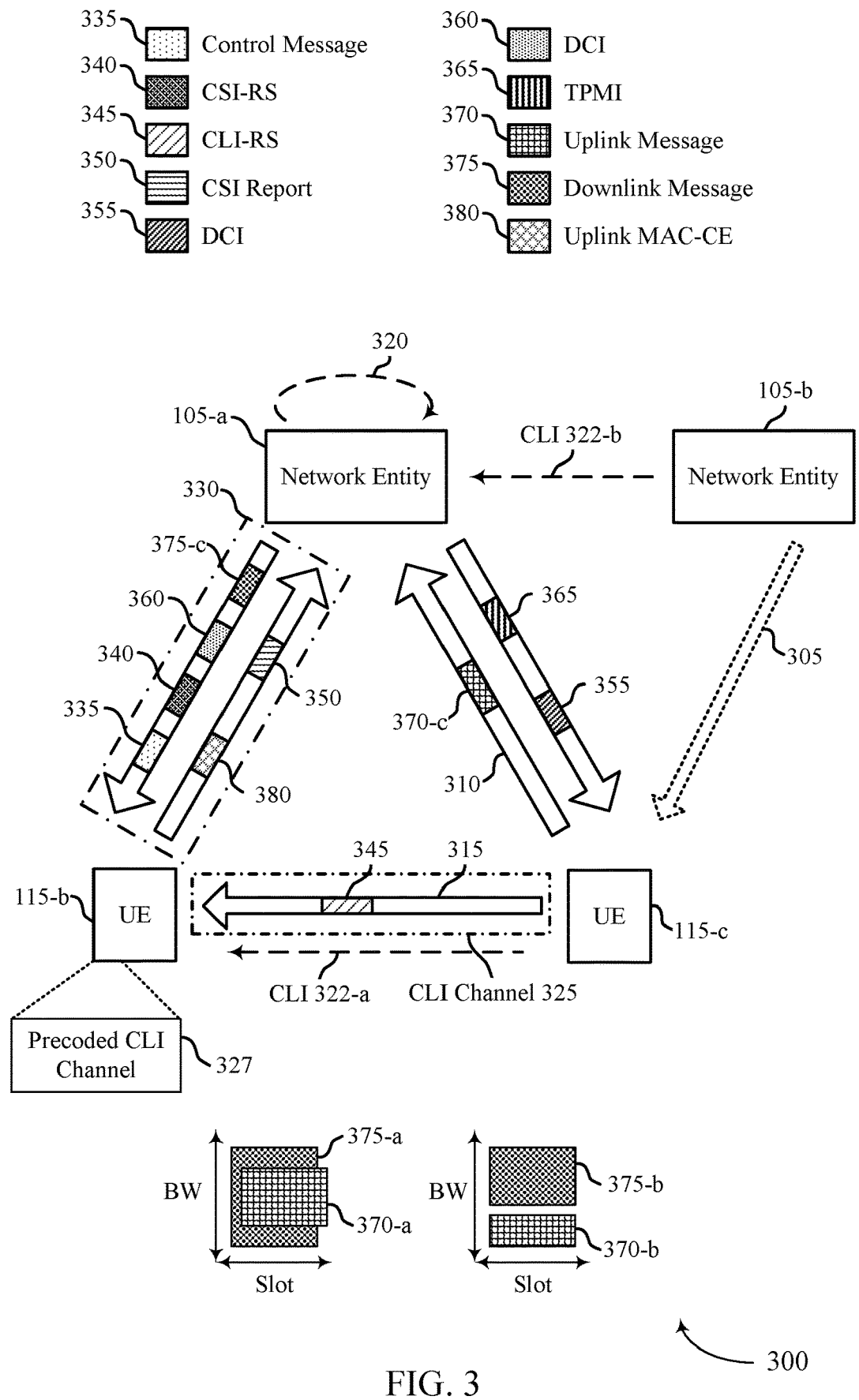
FIG. 3 illustrates an example of a wireless communications system that supports reporting configurations for CLI based CSI in accordance with one or more aspects of the present disclosure.

FIG. 3 illustrates an example of a wireless communications system 300 that supports reporting configurations for CLI based CSI in accordance with one or more aspects of the present disclosure. The wireless communications system 300 may implement or be implemented by aspects of wireless communications system 100 as described with reference to FIG. 1. For example, the wireless communications system 300 may include a UE 115-b, a UE 115-c, a network entity 105-a, and a network entity 105-b, which may be examples of the corresponding devices described herein, including with reference to FIGS. 1 and 2.

The wireless communications system 300 may support communication between the UEs 115 and the network entity 105. For example, the network entities 105 may transmit downlink messages to the UEs 115 via respective communication links 305, and the UEs 115 may transmit uplink messages to the network entities 105 via respective communications links 310. The communications links 305 and 310 may be examples of a communication link 125 described herein, including with reference to FIG. 1. The wireless communications system 300 may also support communication between the UEs 115, for example, via a communication link 315.

The wireless communications system 300 may also support full duplex communications between various combinations of the UEs 115 and the network entities 105. For example, the network entity 105-a may concurrently communicate uplink messages 370 and downlink messages 375 with the UE 115-b, the UE 115-c, or both. Additionally or alternatively, the UE 115-c may concurrently communicate uplink messages 370 and downlink messages 375 with the network entity 105-a, the network entity 105-b, or both (e.g., in multi-RU communication scenarios). Other examples of full duplex communications may also be supported by the wireless communications system 300.

In some examples, full duplex communications may be in-band full duplex communications or subband full duplex communications. For example, in an example of in-band full duplex communication, an uplink message 370-a and a downlink message 375-a may be concurrently transmitted via shared time and frequency resources. That is, a time and frequency resource (e.g., a slot and bandwidth) via which the uplink message 370-a is communicated may overlap (e.g., full or partial overlap) with a time and frequency resource (e.g., a slot and bandwidth) via which the downlink message 375-a is communicated. In an example of subband full duplex communications, an uplink message 370-b and a downlink message 375-b may be concurrently transmitted via shared time resources but different frequency resources.

That is, the uplink message 370-b and the downlink message 375-b may be communicated via overlapping time resources (e.g., fully overlapping, such as via a same slot, or partially overlapping). However, the uplink message 370-b and the downlink message 375-b may be communicated via non-overlapping frequency resources (e.g., via different sub-bands of a bandwidth). In some examples, a guard band may separate the frequency resources of the uplink message 370-b and the downlink message 375-b in the frequency domain.

Full duplex communications may be associated with self-interference 320, CLI 322, or both. For example, self-interference 320 at a communication device may result from the concurrent communication of uplink messages 370 and downlink messages 375. For instance, in the example of FIG. 3, an uplink message 370 that is received at the network entity 105-a may interfere with a downlink message 375 that is transmitted by the network entity 105-a concurrent with reception of the uplink message 370, or vice versa. Such interference may be referred to as self-interference 320. UEs 115 operating in a full duplex mode may similarly experience self-interference 320. CLI 322 may result from concurrent communication of uplink messages 370 and downlink messages 375 between different communication devices. For example, in the example of FIG. 3, an uplink message 370 transmitted by the UE 115-c may interfere with a downlink message 375 that is concurrently received at the UE 115-b, thereby causing CLI 322-a. In the example of FIG. 3, a downlink message 375 transmitted by the network entity 105-b may interfere with an uplink message 370 that is concurrently received at the network entity 105-a, thereby causing CLI 322-b. Other examples of CLI 322 between communication devices are also possible.

In some examples, inter-UE CLI (e.g., the CLI 322-a) may be intra-cell CLI or inter-cell CLI. For example, if the UE 115-b and the UE 115-c are in a same cell, the CLI 322-a would constitute intra-cell CLI (e.g., CLI from UEs 115 in the same cell). Alternatively, if the UE 115-b and the UE 115-c are in different cells (e.g., adjacent cells), the CLI 322-a would constitute inter-cell CLI (e.g., CLI from UEs 115 in different cells). CLI 322 may degrade a signal quality of full duplex communications, for example, by adding additional noise to a channel between communication devices, thereby reducing a reliability of full duplex communications.

To reduce CLI 322 impact on full duplex communications, a UE 115 may report CSI that considers the impact of CLI. For example, the network entity 105-a may transmit a control message 335 (e.g., via RRC signaling) to the UE 115-b that indicates a reporting configuration for indicating CLI based CSI that is associated with a channel 330 between the UE 115-b and the network entity 105-a. The reporting configuration may include various parameters for generating and reporting the CLI based CSI, as described below.

In some examples, the network entity 105-a may transmit additional control messages 335 (e.g., via RRC signaling) to the UE 115-b and the UE 115-c that indicates (e.g., allocates, schedules, configures) a resource via which the UE 115-b may receive a CLI-RS 345 from the UE 115-c. The UE 115-b may receive and measure the CLI-RS 345 via the second resource and may estimate a CLI channel 325 between the UE 115-b and the UE 115-c based on measurements of the CLI-RS 345. For example, the CLI-RS 345 may be a multi-port reference signal that that enables the UE 115-b to compute a CLI channel matrix Hai of the CLI channel 325. That is, the UE 115-c may transmit the CLI-RS 345 using two or more transmit antenna ports, and the UE 115-b may receive the CLI-RS 345 using two or more receive antenna ports, which may enable the UE 115-b to compute and estimate Hai. In some examples, the network entity 105-a may transmit a control message, such as DCI 355, to the UE 115-c to trigger the transmission of the CLI-RS 345, for example, if the resource is an aperiodic resource or a semi-persistent scheduling (SPS) resource. In some examples, the resource may be a periodic resource, and the UE 115-c may transmit the CLI-RS 345 in accordance with a periodicity of the second resource and without reception of (e.g., triggering by) the DCI 355.

The network entity 105-a may transmit a CSI-RS 340 to the UE 115-b that is associated with generating the CLI based CSI. For example, the UE 115-b may receive and measure the CSI-RS 340 and may estimate the channel 330 (e.g., compute and estimate a channel matrix H of the channel 330) based on measurements of the CSI-RS 340. The UE 115-b may use the estimate of the channel 330 in generating the CLI based CSI.

In some examples, the reporting configuration indicated via the control message 335 may indicate one or more candidate precoding matrices associated with uplink precoding at the UE 115-c. In some examples, the network entity 105-a may transmit DCI 360 to the UE 115-b that indicates the one or more candidate precoding matrices. For example, the reporting configuration or the DCI 360 may include one or more TPMIs or transmission rank indicators (TRIs) that indicate one or more precoding matrices that are candidates for precoding an uplink message 370 (e.g., an uplink message 370-c) at the UE 115-c. In some examples, the TPMIs or TRIs may indicate precoding matrices to exclude as candidates, and the UE 115-b may use non-excluded (e.g., remaining) precoding matrices from a set of precoding matrices as candidate precoding matrices. The uplink message 370-c may correspond to a prospective (e.g., future) uplink message 370 that may (e.g., or may not) be subsequently scheduled to be transmitted by the UE 115-c concurrent with reception of a downlink message 375-c (e.g., a prospective downlink message 375) at the UE 115-b. Accordingly, if subsequently communicated, the uplink message 370-c may cause CLI 322-a at the UE 115-b, thus decreasing a reliability of the downlink message 375-c.

Uplink precoding of the uplink message 370-c may affect the CLI 322-a (e.g., a level or strength of CLI caused by the uplink message 370-c). For example, precoding the uplink message 370-c using different precoding matrices may result in transmitting the uplink message 370-c using different beam patterns and beam directions. Based on the location of the UE 115-b relative to the location of the UE 115-c, different beam patterns and beam directions for the uplink message 370-c may correspond to different strengths of the CLI 322-a.

The UE 115-b may estimate the CLI 322-a based on the one or more candidate precoding matrices for the uplink message 370-c and the CLI channel 325. For example, the UE 115-b may generate a precoded CLI channel 327 using the CLI channel 325 (e.g., at least one estimated CLI channel 325) and the one or more candidate precoding matrices. For instance, a downlink signal that is received at the UE 115-b from the network entity 105-a concurrent with transmission of an uplink signal by the UE 115-c may be computed according to Equation 1 below:

$$y = HPx + H_{CLI}Tz + n \qquad (1)$$

In Equation 1, y is the received downlink signal, H is the channel matrix corresponding to the channel 330, P is a downlink precoding matrix (e.g., a precoding matrix indicated by a PMI) used by the network entity 105-*a*, x is the desired downlink signal, $H_{CLI}$ is the channel matrix corresponding to the CLI channel 325, T is an uplink precoding matrix (e.g., a precoding matrix indicated by a TPMI) used by the UE 115-*c*, z is the uplink signal, and n is noise. The precoded CLI channel 327 may correspond to $H_{CLI}T$. CLI 322-*a* observed at the UE 115-*b* may be based on the effective or precoded CLI channel $H_{CLI}T$, a transmission power of the uplink signal, a rank of the uplink signal, or a combination thereof. Accordingly, based on estimating the CLI channel 325 using the CLI-RS 345 and being indicated a candidate precoding matrix for the uplink message 370-*c*, the UE 115-*b* may generate the precoded CLI channel 327 and consider the impact of the precoded CLI channel 327 in generating CSI to report to the network entity 105-*a*. The UE 115-*b* may also estimate the impact that different candidate precoding matrices for the uplink message 370-*c* (e.g., different Ts) have on the precoded CLI channel 327 and generate CSI based on the precoded CLI channel 322-*a* generated using one or more candidate precoding matrices.

For example, the UE 115-*b* may transmit a CSI report 350 to network entity 105-*a* in response to the CSI-RS 340 that includes CSI generated based on measurements of the CSI-RS 340, measurements of the CLI-RS 345, and one or more candidate precoding matrices (e.g., the CSI-RS 340 and precoded CLI channel 327). In an example of selecting a PMI for inclusion in the CSI report 350, the UE 115-*b* may estimate the channel 330 (e.g., the channel matrix H) based on the CSI-RS 340 and may estimate or generate, based on the effective or precoded CLI channel $H_{CLI}T$, a linear transformation W used to uncorrelate the channel 330 via receive antenna ports of the UE 115-*b* (e.g., a whitening matrix, a sphering transformation). The UE 115-*b* may consider a candidate PMI P for selection and may compute a covariance matrix of the equivalent channel 330 $\tilde{H}$, where $\tilde{H}=WHP$. The UE 115-*b* may compute the spectral efficiency based on the covariance matrix of the equivalent channel $\tilde{H}$. The UE 115-*b* may compute the spectral efficiency corresponding to multiple candidate PMIs and may select a PMI for inclusion in the CSI report 350 that maximizes spectral efficiency. The UE 115-*b* may similarly select other types of CSI (e.g., RI, CQI, etc.) for inclusion in the CSI report 350. Thus, the UE 115-*b* may generate the CSI for inclusion in the CSI report 350 based on the CSI-RS 340 and the precoded CLI channel 327 (e.g., the estimated CLI 322-*a*).

In some examples, the network entity 105-*a* may transmit a control message, such as the DCI 360, to the UE 115-*b* to trigger the communication of the CSI-RS 340 and the CSI report 350, for example, if the first resource is an aperiodic resource or SPS resource. In some examples, the CSI-RS 340 and the CSI report 350 may be communicated via periodic resources, and the UE 115-*c* may receive the CSI-RS 340 and transmit the CSI report 350 in accordance with a periodicity of the periodic resources and without reception of (e.g., triggering by) the DCI 360.

The reporting configuration indicated via the control message 335 may indicate various parameters according to which the UE 115-*b* may generate and report the CSI via the CSI report 350. For example, the UE 115-*b* may estimate respective precoded CLI channels 327 for multiple indicated candidate precoding matrices. In some examples, the reporting configuration may indicate for the UE 115-*b* to generate the CSI using a candidate precoding matrix associated with a precoded CLI channel 327 that is associated with a minimum estimated interference with the channel 330. In some examples, the reporting configuration may indicate for the UE 115-*b* to generate the CSI using a candidate precoding matrix associated with a precoding CLI channel 327 that is associated with a maximum estimated interference with the channel 330. In some examples, the reporting configuration may indicate for the UE 115-*b* to generate the CSI based on an average of the estimated precoding CLI channels 327. In some cases, the reporting configuration may indicate for the UE 115-*b* to report the candidate precoding matrix used in generating the CSI. For example, in accordance with the reporting configuration, the UE 115-*b* may transmit the CSI report 350 that includes an indication of the candidate precoding matrix (e.g., the TPMI) that is associated with the minimum estimated interference or the maximum estimated interference.

In some examples, the reporting configuration may indicate for the UE 115-*b* to indicate one or more non-preferred candidate precoding matrices for use by the UE 115-*c* to precode and transmit the uplink message 370-*c*. For example, the UE 115-*b* may generate the CSI assuming that a set of candidate precoding matrices (e.g., a set of TPMIs) will be unused by the UE 115-*c* in transmitting the uplink message 370-*c*. That is, the set of candidate precoding matrices may be unused by the UE 115-*b* to estimate the precoded CLI channel 327 (e.g., the CLI 322), and the UE 115-*b* may transmit an indication of the unused set of candidate precoding matrices (e.g., the non-preferred candidate precoding matrices) to the network entity 150-*a*. In some examples, the UE 115-*b* may include the indication in the CSI report 350. In some examples, the UE 115-*b* may include the indication in an uplink MAC-control element (MAC-CE) 380. Additional details related to the various parameters that may be included in the reporting configuration are described with reference to FIG. 5 below. Additional details related to the uplink MAC-CE 380 are described with reference to FIG. 7 below.

The network entity 105-*a* may manage full duplex communications with the UE 115-*b* and the UE 115-*c* based on the reported CLI based CSI. For example, the network entity 105-*a* may transmit the downlink message 375-*c* in accordance with the CLI based CSI, for example, using a precoding matrix indicated by a PMI included in the CSI report 350. Because the PMI was selected by the UE 115-*b* considering the impact of CLI 322 (e.g., precoded CLI channels 327), a reliability of the downlink message 375-*c* may be increased, for example, relative to if the downlink message 375-*c* were precoded in accordance with a PMI selected by the UE 115-*b* without considering the impact of CLI 322. Additionally or alternatively, the network entity 105-*a* may select a precoding matrix for the UE 115-*c* to use in precoding the uplink message 370-*c* based on the CLI based CSI. For example, the network entity 105-*a* may select the precoding matrix for precoding of the uplink message 370-*c* such that CLI 322-*a* may be reduced. Additionally or alternatively, the network entity 105-*a* may transmit a TPMI 365 to the UE 115-*c* that indicates the selected precoding matrix, and the UE 115-*c* may transmit the uplink message 370-*c* in accordance with the TPMI 365. Alternatively, the network entity 105-*a* may determine to schedule the downlink message 375-*c* and the uplink message 370-*c* to be non-overlapping in time so that the CLI 322-*a* may not affect reception of the downlink message 375-*c*. Thus, by managing full duplex communications based on CLI based CSI, full duplex communication reliability may be increased.

Figure 4:
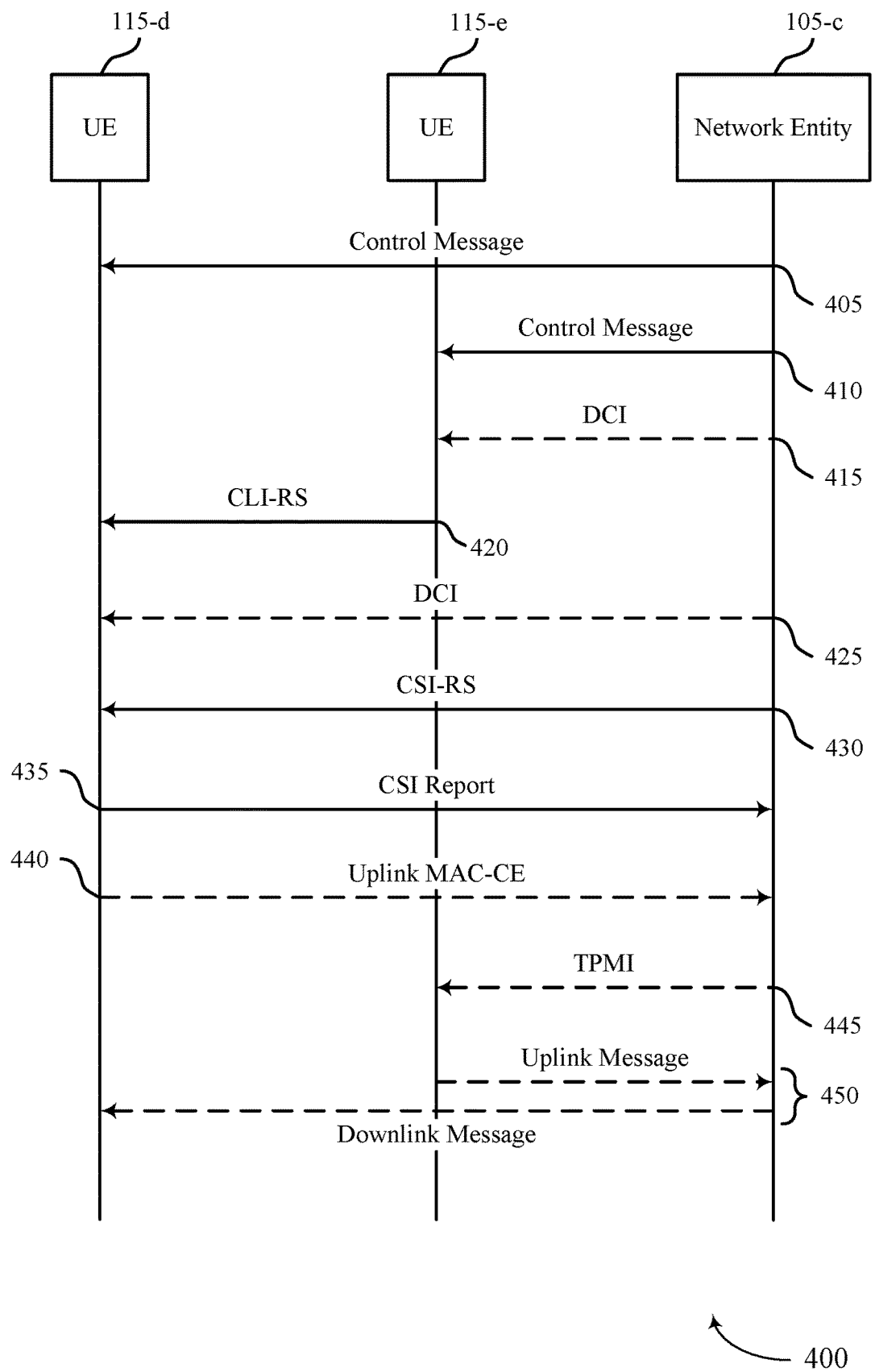
FIG. 4 illustrates an example of a process flow that supports reporting configurations for CLI based CSI in accordance with one or more aspects of the present disclosure.

FIG. 4 illustrates an example of a process flow 400 that supports reporting configurations for CLI based CSI in accordance with one or more aspects of the present disclosure. The process flow 400 may be implemented by aspects of the wireless communications systems 100 or 300. For example, the process flow 400 may illustrate communication between a UE 115-d, a UE 115-e, and a network entity 105-c, which may be examples of corresponding devices described herein, including with reference to FIGS. 1 through 3.

In the following description of the process flow 400, the operations may be performed in a different order than the order shown. Specific operations also may be left out of the process flow 400, or other operations may be added to the process flow 400. Further, although some operations or signaling may be shown to occur at different times for discussion purposes, these operations may actually occur at the same time.

At 405, the network entity 105-c may transmit a first control message (e.g., via RRC signaling) to the UE 115-d. The first control message may indicate a reporting configuration for the UE 115-d to report CLI based CSI to the network entity 105-c in accordance with examples described herein. In some examples, the first control message (e.g., or another control message) may indicate a first resource for communication of a CSI-RS associated with estimation of a channel between the UE 115-d and the network entity 105-c. In some examples, the first control message (e.g., or another control message) may indicate a second resource for reception of a CLI-RS associated with estimation of a CLI channel between the UE 115-d and the UE 115-e. In some examples, the first control message may indicate one or more candidate precoding matrices (e.g., TPMIs) associated with uplink precoding at the UE 115-e.

At 410, the network entity 105-c may transmit a second control message (e.g., included in RRC signaling) to the UE 115-e. The second control message may indicate the second resource for transmission of the CLI-RS to the UE 115-d by the UE 115-e.

At 415, the network entity 105-c may transmit first DCI to the UE 115-e that triggers transmission of the CLI-RS. For example, if the second resource is an aperiodic resource, the first DCI may schedule the aperiodic resource such that the UE 115-e may transmit the CLI-RS via the aperiodic resource. If the second resource is an SPS resource, the first DCI may activate the SPS resource such that the UE 115-e may transmit the CLI-RS via the SPS resource. In some examples, the network entity 105-c may transmit the first DCI to the UE 115-d to trigger reception of the CLI-RS.

At 420, the UE 115-e may transmit the CLI-RS to the UE 115-d via the second resource. The UE 115-d may measure the CLI-RS and estimate the CLI channel (e.g., a CLI channel matrix $H_{CLI}$) between the UE 115-d and the UE 115-e based on measurements of the CLI-RS. Based on the estimated CLI channel and one or more of the candidate precoding matrices, the UE 115-d may generate one or more precoded CLI channels (e.g., a precoded CLI channel $H_{CLI}T$). In some examples, if the second resource is a periodic resource, the UE 115-e and the UE 115-d may communicate the CLI-RS via the periodic resource without communication of the first DCI.

At 425, the network entity 105-c may transmit second DCI to the UE 115-d that triggers communication of a CSI report that includes CSI based on the one or more precoded CLI channels (e.g., estimated CLI between the UE 115-d and the UE 115-e). For example, if the CSI report is an aperiodic CSI report or an SPS CSI report, the second DCI may schedule or activate the first resource for communication of the CSI-RS, aperiodic or SPS resources for communication of the CSI report, or a combination thereof. In some examples, the second DCI may indicate the one or more candidate precoding matrices (e.g., in addition to or instead of triggering communication of the CSI report).

At 430, the network entity 105-c may transmit the CSI-RS to the UE 115-d via the first resource. The UE 115-d may measure the CSI-RS and estimate the channel (e.g., a channel matrix H) between the UE 115-d and the network entity 105-c based on measurements of the CSI-RS.

At 435, the UE 115-d may transmit the CSI report including CLI based CSI to the network entity 105-c. For example, the UE 115-d may generate the CSI based on the estimated channel (e.g., measurements of the CSI-RS) and the one or more precoded CLI channels (e.g., the impact of the precoded CLI channels on the estimated channel) and may transmit the CSI report including the generated CSI to the network entity 105-c in accordance with the reporting configuration. In some examples, the CSI report may include an indication of a candidate precoding matrix used in the generation of the CSI, an indication a set of candidate precoding matrices unused by the UE 115-d in the generation of the CSI (e.g., a set of non-preferred candidate precoding matrices), or a combination thereof, in accordance with the reporting configuration.

At 440, the UE 115-d may transmit an uplink MAC-CE to the network entity 105-d that indicates the set of unused candidate precoding matrices. In some examples, the uplink MAC-CE may indicate multiple sets of unused candidate precoding matrices corresponding to multiple CSI reports including the CSI report.

At 445, the network entity 105-c may transmit a TPMI to the UE 115-e that indicates a precoding matrix for precoding a full duplex uplink message. The network entity 105-c may select the TPMI based on the CSI report. For example, based on the CSI report, the network entity 105-c may select the TPMI such that CLI at the UE 115-d that is caused by transmission of the full duplex uplink message may be reduced.

At 450, the full duplex uplink message and a full duplex downlink message may be communicated. For example, the UE 115-e may transmit the full duplex uplink message to the network entity 105-c, and the network entity 105-c may concurrently transmit the full duplex downlink message to the UE 115-d. In some examples, the network entity 105-c may transmit the full duplex downlink message to the UE 115-d using communication parameters (e.g., a transmission power, a precoding matrix, beamforming weights, a modulation scheme, a coding rate, and the like) based on the CLI based CSI such that an impact of the CLI at the UE 115-d may be reduced and a reliability of the full duplex downlink message may be increased.

Figure 5:
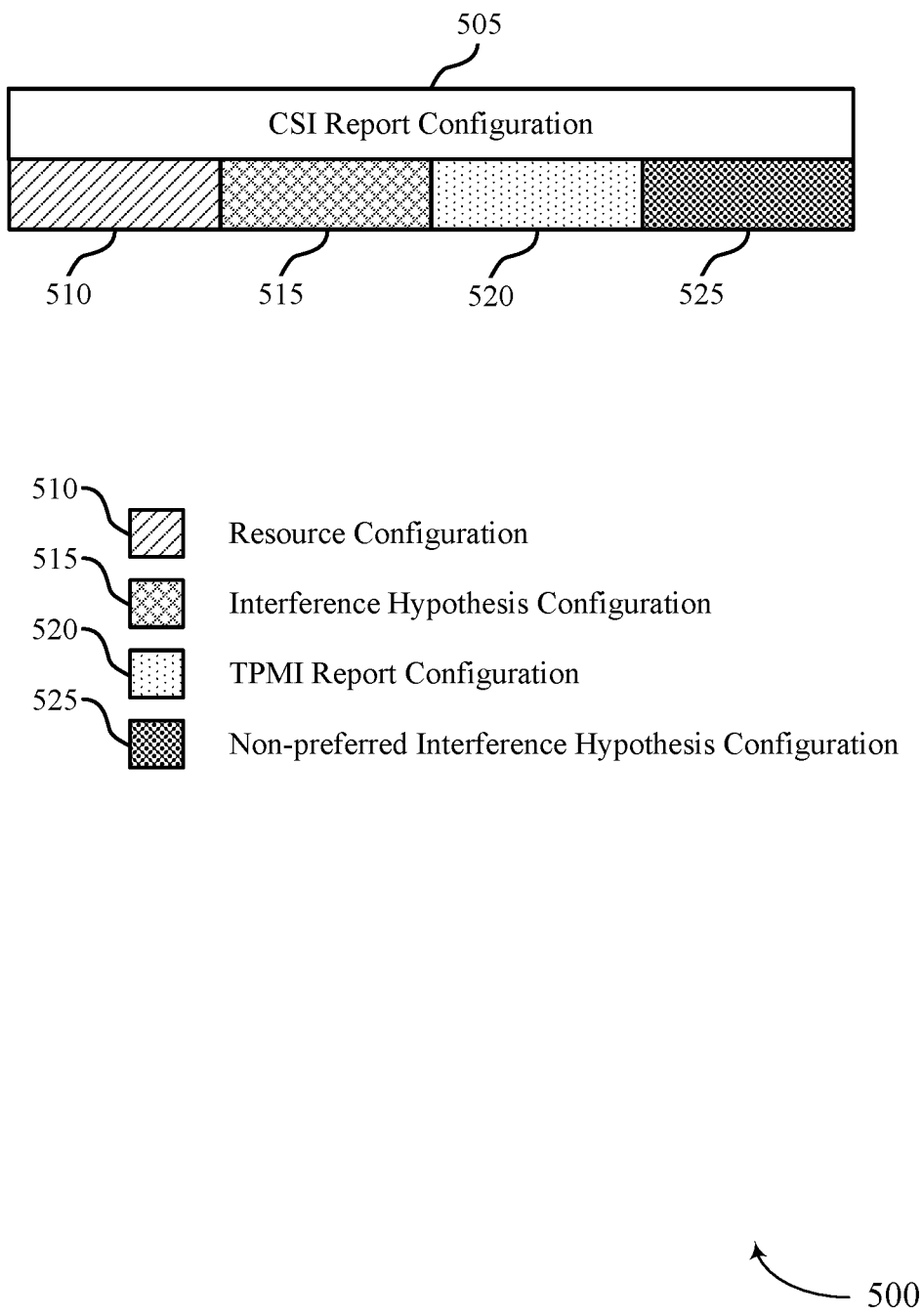
FIG. 5 illustrates an example of a configuration diagram that supports reporting configurations for CLI based CSI in accordance with one or more aspects of the present disclosure.

FIG. 5 illustrates an example of a configuration diagram 500 that supports reporting configurations for CLI based CSI in accordance with one or more aspects of the present disclosure. The configuration diagram 500 may be implemented by aspects of wireless communications systems 100 or 300 as described with reference to FIGS. 1 and 3, respectively. For example, the configuration diagram 500 may be implemented by a UE 115 and a network entity 105 to support CLI based CSI generation and reporting.

The configuration diagram 500 illustrates a CSI report configuration 505, which may be an example of a reporting configuration indicated via a control message 335 as described with reference to FIG. 3. For example, the CSI report configuration 505 may indicate various parameters according to which a UE 115 may generate and report CSI based on estimated CLI. In some examples, a network entity 105 may transmit the CSI report configuration 505 to a UE 115 via RRC signaling.

The CSI report configuration 505 may include various fields used to indicate the various parameters to the UE 115. For example, the CSI report configuration 505 may include a resource configuration 510, an interference hypothesis configuration 515, a TPMI report configuration 520, a non-preferred interference hypothesis configuration 525, or a combination thereof. The resource configuration 510 may indicate one or more resources via which signaling may be communicated to support the CLI based CSI generation and reporting. For example, the resource configuration 510 may indicate a first measurement resource via which a network entity 105 may transmit a CSI-RS (e.g., a CSI-RS 340) to a first UE 115, which the first UE 115 may receive and measure to estimate a channel between the first UE 115 and the network entity 105. The resource configuration 510 may also indicate a second measurement resource via which a second UE 115 may transmit a CLI-RS to the first UE 115, which the first UE 115 may receive and measure to estimate a CLI channel between the first UE 115 and the second UE 115. Other measurement resources may also be indicated by the resource configuration 510, such as an interference measurement resource for CSI-interference measurement (CSI-IM), among others.

The interference hypothesis configuration 515 may indicate one or more interference hypotheses for the first UE 115 to consider in generating CLI based CSI. An interference hypothesis may correspond to one or more candidate precoding matrices associated with uplink precoding at an aggressor UE 115 (e.g., a UE 115 that causes CLI via transmission of an uplink message, such as the UE 115 $c$ or the UE 115 $e$) that may be used by a victim UE 115 (e.g., a UE 115 that experiences the CLI, such as the UE 115 $b$ or the UE 115 $d$) in generating CLI based CSI. For example, assuming that the CLI channel is known to first UE 115 (e.g., the victim UE 115), CLI experienced at the first UE 115 via the CLI channel may be estimated based on a candidate precoding matrix associated with uplink precoding at the second UE 115 (e.g., the aggressor UE 115). For instance, using the candidate precoding matrix and the CLI channel (e.g., a channel matrix $H_{CLI}$ corresponding to the CLI channel), the first UE 115 may generate a precoded CLI channel (e.g., $H_{CLI}T$) at the first UE associated with at least one uplink transmission associated with the second UE 115. In some examples, the precoded CLI channel may correspond to estimated (e.g., predicted) CLI at the first UE 115 if the second UE 115 transmits the uplink transmission using the candidate precoding matrix. Accordingly, by indicating the one or more interference hypotheses, the interference hypothesis configuration 515 may enable the first UE 115 to estimate CLI at the first UE 115 (e.g. based on one or more precoded CLI channels) and generate CSI based on the estimated CLI.

In some examples, the interference hypothesis configuration 515 may indicate one or more interference hypotheses to exclude from consideration in generating CLI based CSI. For example, interference hypotheses indicated by the interference hypothesis configuration 515 may correspond to interference hypotheses of a set of interference hypotheses that the first UE 115 is to exclude in generating precoded CLI channels (e.g., estimating CLI) at the first UE 115. Here, the interference hypotheses used by the first UE 115 to generate precoded CLI channels may correspond to non-excluded interference hypotheses of the set of interference hypotheses. For example, if the interference hypothesis configuration 515 indicates to exclude ranks 2-4 (e.g., via the inclusion of TRIs corresponding to ranks 2-4), the first UE 115 may generate the CSI assuming a rank of 1 at the second UE 115. Accordingly, the first UE 115 may consider candidate precoding matrices corresponding to 1-layer transmissions and exclude candidate precoding matrices corresponding to 2 to 4-layer transmissions from consideration based on the interference hypothesis configuration 515 indicating the exclude ranks 2-4. In some examples, the interference hypothesis configuration 515 may include one or more TPMIs, one or more TRIs, or a combination thereof, associated with excluding corresponding candidate precoding matrices from consideration. In some examples, if the interference hypothesis configuration 515 does not indicate a rank of the second UE 115 (e.g., via inclusion of TRIs that indicate ranks to include or exclude), a default rank of the second UE 115 may be assumed, such as a default rank of 1.

In some examples, the network entity 105 may indicate the one or more interference hypotheses via DCI (e.g., DCI 360), for example, if the CSI report configuration 505 is associated with the reporting of aperiodic CSI or SPS CSI via an aperiodic CSI report or an SPS CSI report, respectively. For example, the CSI report configuration 505 may exclude the interference hypothesis configuration 515. Instead, the network entity 105 may transmit the interference hypothesis configuration 515 via the DCI that triggers the aperiodic CSI report or activates the SPS CSI report. Alternatively, the CSI report configuration 505 may include the interference hypothesis configuration 515, and the DCI may update (e.g., change, remove, add) one or more of the interference hypotheses or select a subset of the interference hypotheses for consideration in generating the CSI.

The TPMI report configuration 520 may indicate how to generate and report CLI based CSI. For example, the TPMI report configuration 520 may indicate for the first UE 115 to report optimistic CSI assuming an interference hypothesis having the least impact on downlink messages received at the first UE 115. That is, the TPMI report configuration 520 may indicate for the first UE 115 to generate CSI based on a candidate precoding matrix that is associated with a minimum interference with a channel between the first UE 115 and the network entity 105 (e.g., a minimum estimated CLI at the first UE 115). For example, the first UE 115 may generate a set of precoded CLI channels corresponding to a set of interference hypotheses (e.g., indicated via the interference hypothesis configuration 515 or DCI). That is, the first UE 115 may generate a set of precoded CLI channels, where each precoded CLI is generated based on an estimated CLI channel of a set of CLI channels at the first UE 115 corresponding to a set of uplink transmissions associated with the second UE 115 and based on a candidate precoding matrix. The precoded CLI channels may correspond to estimated (e.g., predicted) CLIs at the first UE 115 if the second UE 115 transmits the set of uplink transmissions using the candidate precoding matrices corresponding to the set of interference hypotheses. The first UE 115 may generate CSI based on the interference hypothesis (e.g., TPMI) that is associated with the minimum estimated CLI relative to the other estimated CLIs of the set of CLIs. That is, the first UE 115 may generate CSI based on the interference hypothesis associated with minimum interference with the channel between the first UE 115 and the network entity 105. The TPMI report configuration 520 may also indicate for the first UE 115 to report the TPMI that is associated with the minimum estimated CLI, for example, by including an indication of the TPMI in a CSI report.

Alternatively, the TPMI report configuration 520 may indicate for the first UE 115 to report pessimistic CSI assuming an interference hypothesis having the most impact on downlink messages received at the first UE 115. That is, the TPMI report configuration 520 may indicate for the first UE 115 to generate CSI based on a candidate precoding matrix that is associated with a maximum interference with the channel between the first UE 115 and the network 105 (e.g., a maximum estimated CLI at the first UE 115). For example, the first UE 115 may generate a set of precoded CLI channels corresponding to a set of interference hypotheses. The first UE 115 may generate CSI based on the interference hypothesis (e.g., TPMI) that is associated with the maximum estimated CLI relative to the other estimated CLIs of the set of CLIs. The TPMI report configuration 520 may also indicate for the first UE 115 to report the TPMI that is associated with the maximum estimated CLI, for example, by including an indication of the TPMI in the CSI report.

Alternatively, the TPMI report configuration 520 may indicate for the first UE 115 to generate CSI based on an average of a set of precoded CLI channels (e.g., a set of estimated CLIs). For example, the first UE 115 may generate a set of precoded CLI channels corresponding to a set of interference hypotheses. The first UE 115 may generate CSI based on an average of the set of precoded CLI channels (e.g., an average of channel matrices $H_{CLI}T$ computed based on the interference hypotheses).

In some examples, the TPMI report configuration 520 may be excluded from the CSI report configuration 505. Here, a behavior of the first UE 115 for generating and reporting CLI based CSI when multiple interference hypotheses are indicated by the network entity 105 may be a known behavior between the first UE 115 and the network entity 105. For example, if the network entity 105 indicates multiple interference hypotheses for consideration, it may be known to the first UE 115 and the network entity 105 whether the first UE 115 is to generate and report CLI based CSI based on a minimum interference with the channel, a maximum interference with the channel, or an average of precoded CLI channels.

The non-preferred interference hypothesis configuration 525 may indicate whether the first UE 115 is to report non-preferred interference hypotheses to the network entity 105 within or in association with the CSI report. For example, the first UE 115 (e.g., the victim UE 115) may report CSI assuming that the second UE 115 (e.g., an aggressor UE 115) does not use a subset of interference hypotheses corresponding to a subset of candidate precoding matrices (e.g., a subset of TPMIs). That is, in generating the reported CSI, the subset of interference hypotheses may be unused by the first UE 115 to generate at least one precoded CLI channel (e.g., estimate CLI) at the first UE 115 in association with generating the reported CSI. The first UE 115 may report the subset of unused interference hypotheses to a network entity 105 as non-preferred interference hypotheses. Such non-preferred interference hypothesis reporting may indicate to the network entity 105 that the CSI was generated (e.g., calculated, selected) by the first UE 115 assuming that a TPMI to be transmitted to the second UE 115 is excluded from the subset of TPMIs. Accordingly, to minimize CLI at the first UE 115, the network entity 105 should not select a TPMI corresponding to one of the subset of candidate precoding matrices for transmission to the second UE 115.

In some examples, the non-preferred interference hypothesis configuration 525 may be a dedicated field in the CSI report configuration 505 that indicates whether reporting of non-preferred interference hypotheses is configured. For example, non-preferred interference hypothesis configuration 525 may be a field such as "Report non-preferred TPMI={configured, not-configured}". In some examples, the non-preferred interference hypothesis configuration 525 may indicate a field in a CSI report including an indication of the unused interference hypotheses. For example, the CSI report configuration 505 may include various report quantities to be reported by the first UE 115, such as a report quantity indicating for the first UE 115 to report a PMI, a CQI, an RI, etc. The non-preferred interference hypothesis configuration 525 may be a report quantity field indicating a field in a CSI report for including an indication of the set of unused interference hypotheses. For example, the non-preferred interference hypothesis configuration 525 may be a report quantity field such as "cri-RI-PMI-TPMI/TRI-CQI" that indicates for the first UE 115 to report one or more TPMIs or TRIs in the CSI report that correspond to unused interference hypotheses.

Figure 6:
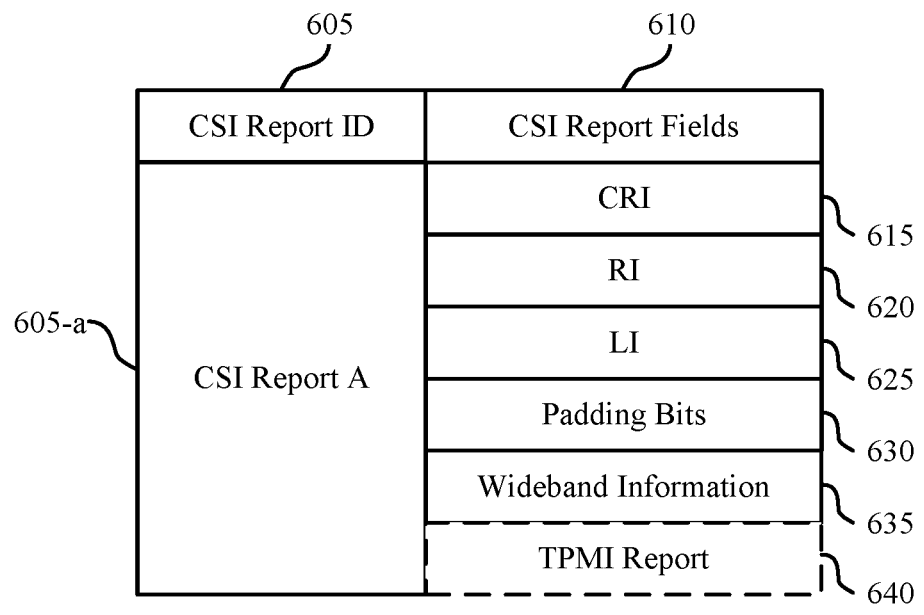
FIGS. 6 and 7 illustrate examples of report diagrams that support reporting configurations for CLI based CSI in accordance with one or more aspects of the present disclosure.

FIG. 6 illustrates an example of a report diagram 600 that supports reporting configurations for CLI based CSI in accordance with one or more aspects of the present disclosure. The report diagram 600 may be implemented by aspects of wireless communications systems 100 or 300 as described with reference to FIGS. 1 and 3, respectively. For example, the report diagram 600 may be implemented by a UE 115 and a network entity 105 to support CLI based CSI generation and reporting.

The report diagram 600 may illustrate an example CSI report transmitted by a UE 115 that is generated based on estimated CLI (e.g., one or more precoded CLI channels). The CSI report may include a CSI report ID identifier (ID) 605 and CSI report fields 610. For example, the CSI report have a CSI report ID 605-a indicating that the CSI report corresponds to a CSI report A. The CSI report fields 610 may include a CRI field 615, an RI field 620, an LI field 625, a padding bit field 630, a wideband information field 635, a TPMI report field 640, or a combination thereof. Other fields may also be included in the CSI report fields 610, such as a SSBRI report field, subband information fields, and the like.

The CRI field 615 may include a CRI that indicates a preferred beam for communicating with a network entity 105. The RI field 620 may include an RI that indicates (e.g., requests) a quantity of spatial layers to be used for transmissions. The LI field 625 may include an LI indicating a strongest layer of the quantity of layers requested by the RI. The padding bit field 630 may include zero padding bits, for example, to support varying bit widths of other fields in the CSI report. The wideband information field 635 may include a wideband PMI indicating a preference for which precoding matrix should be used, a wideband CSI representing a highest order modulation scheme that may be used, or a combination thereof The CSI included in the CSI report A may be generated (e.g., selected) based on at least one precoded CLI channel at the first UE 115 (e.g., estimated CLI between the UE 115 and a second UE 115) in accordance with examples described herein. In some examples, the UE 115 may be indicated multiple candidate precoding matrices (e.g., may be indicated multiple TPMIs) for use in estimating CLI and generating CSI. The UE 115 may report the candidate precoding matrix used to generate the CSI included in the CSI report A. For example, the UE 115 may include an indication in the CSI report A of the candidate precoding matrix.

In some examples, the CSI report A may include a TPMI report field 640 that includes the indication of the candidate precoding matrix to which the CSI included in the CSI report A corresponds. For example, the TPMI report field 640 may include a TPMI index corresponding to the candidate precoding matrix. In some examples, a payload of the CSI report A may be increased in order to support the inclusion of the TPMI report field 640 in the CSI report A. For example, to support indicating to which candidate precoding matrix the CSI of the CSI report A corresponds, the payload of the CSI report A may be increased to be able to include the TPMI report field 640. Accordingly, a size of the payload of the CSI report A may be based on whether the TPMI report field 640 is included.

In some examples, the TPMI report field 640 may replace (e.g., partially replace) an existing field of the CSI report A. For example, if one or more of the other CSI report fields 610 are unused, the TPMI report field 640 may replace an unused CSI report field 610 so as to support the indication of the candidate precoding matrix without increasing the payload of the CSI report. For instance, if an LI is unreported in accordance with a reporting configuration, the LI field 625 may be unused and replaced with the TPMI report field 640. Additionally or alternatively, a quantity of zero padding bits included in the CSI report A may be based on a quantity of antenna ports used in the calculation of the CSI report A. The quantity of antenna reports may be constrained such that there are a sufficient quantity of zero padding bits to support replacement of at least some of the zero padding bits with the TPMI report field 640. By replacing an unused CSI report field 610 with the TPMI report field 640, the UE 115 may transmit the indication of the candidate precoding matrix in a CSI report field 610 associated with or supporting the reporting of one or more types of CSI.

Figure 7:
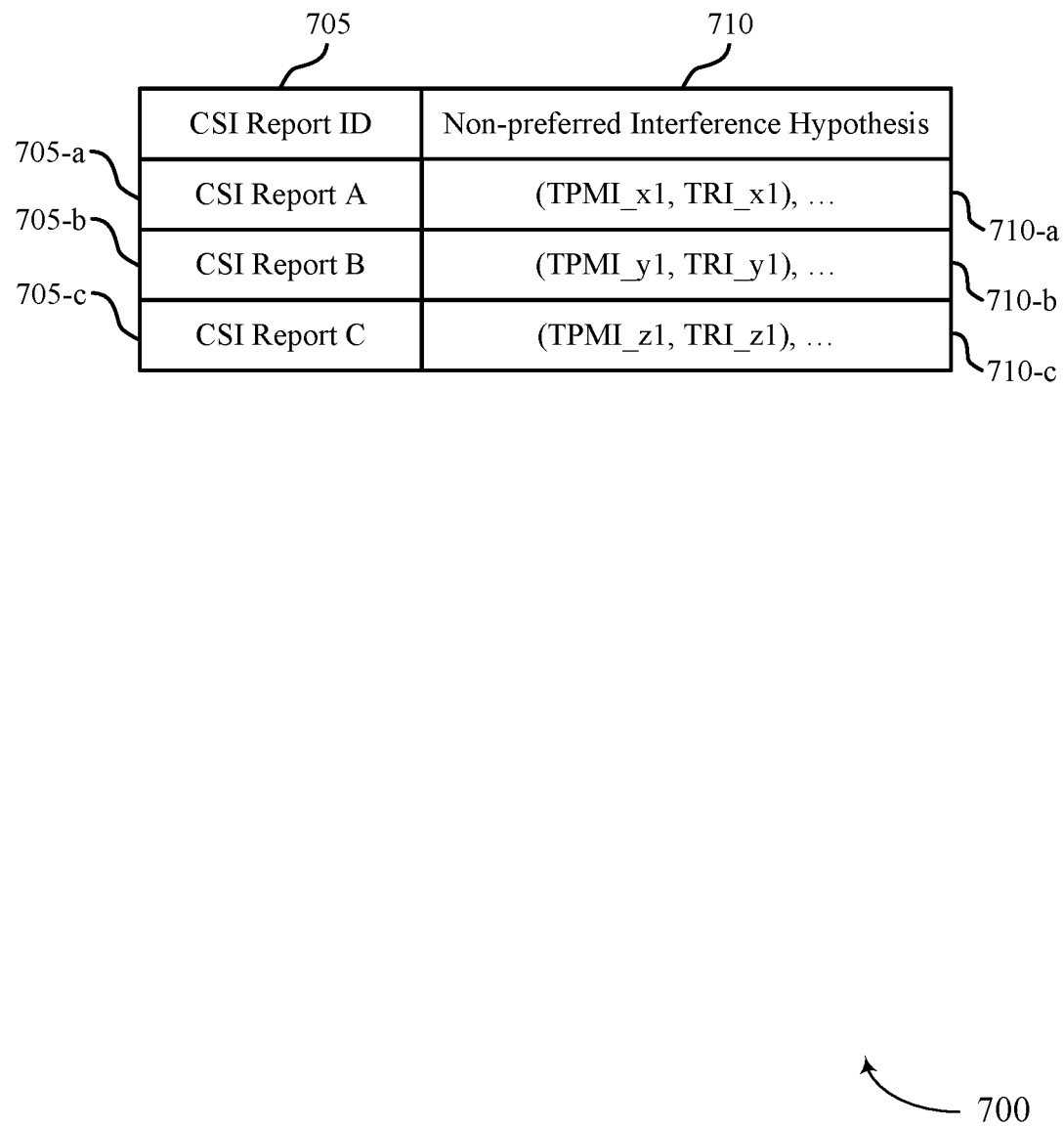

FIG. 7 illustrates an example of a report diagram 700 that supports reporting configurations for CLI based CSI in accordance with one or more aspects of the present disclosure. The report diagram 700 may be implemented by aspects of wireless communications systems 100 or 300 as described with reference to FIGS. 1 and 3, respectively. For example, the report diagram 700 may be implemented by a UE 115 and a network entity 105 to support CLI based CSI generation and reporting.

The report diagram 700 may illustrate an example uplink MAC-CE transmitted by a victim UE 115 to support the reporting of non-preferred interference hypotheses in generating CSI. The victim UE 115 may report non-preferred interference hypotheses via an uplink MAC-CE (e.g., an uplink MAC-CE 380). For example, to avoid modifying a payload structure of a CSI report to support the reporting of non-preferred interference hypotheses, the victim UE 115 may transmit an uplink MAC-CE that indicates the non-preferred interference hypotheses.

The uplink MAC-CE may include one or more CSI report ID field 705 and one or more non-preferred interference hypothesis fields 710. For example, the uplink MAC-CE may include a CSI report ID field 705-*a* that includes an ID of a CSI report A. The uplink MAC-CE may include a non-preferred interference hypothesis field 710-*a* corresponding to the CSI report ID field 705-*a*. The non-preferred interference hypothesis field 710-*a* may include one or more TPMIs or TRIs that indicate (e.g., correspond to) one or more unused interference hypotheses by the victim UE 115 in generating CSI included in the CSI report A. For example, the non-preferred interference hypothesis field 710-*a* may include a indexes of a TPM_x1, TRI_x1, or both, that indicate that candidate precoding matrices corresponding to the TPMI_x1, TRI_x1 were unused by the victim UE 115 in generating the CSI report A. Any quantity of TPMIs, TRIs, or both, may be included a non-preferred interference hypothesis field 710 to indicate unused sets of candidate precoding matrices.

In some examples, the victim UE 115 may transmit the uplink MAC-CE along with a corresponding CSI report. In some examples, the uplink MAC-CE may correspond to one or multiple CSI reports. That is, the uplink MAC-CE may indicate one or multiple sets of unused interference hypotheses that correspond to one or multiple CSI reports transmitted by the victim UE 115. For example, the uplink MAC-CE may be periodically transmitted by the victim UE 115 to periodically report non-preferred interference hypotheses for the one or more multiple CSI reports.

To support reporting non-preferred interference hypotheses for multiple CSI reports, the uplink MAC-CE may include multiple CSI report ID fields 705 and multiple corresponding non-preferred interference hypothesis fields 710. For example, the uplink MAC-CE may include: a CSI report ID field 705-*b* including an ID of a CSI report B; a corresponding non-preferred interference hypothesis field 710-*b*; a CSI report ID field 705-*c* including an ID of a CSI report C; and a corresponding non-preferred interference hypothesis field 710-*c*. The non-preferred interference hypothesis field 710-*b* may include indexes of a TPMI_y1 or a TRI_y1 (e.g., among others that may be included) that may indicate unused candidate precoding matrices in association with generating the CSI report B, and the non-preferred interference hypothesis field 710-*c* may include indexes of a TPMI_z1 or a TRI_z1 (e.g., among others that may be included) that may indicate unused candidate precoding matrices in association with generating the CSI report C.

Figure 8:
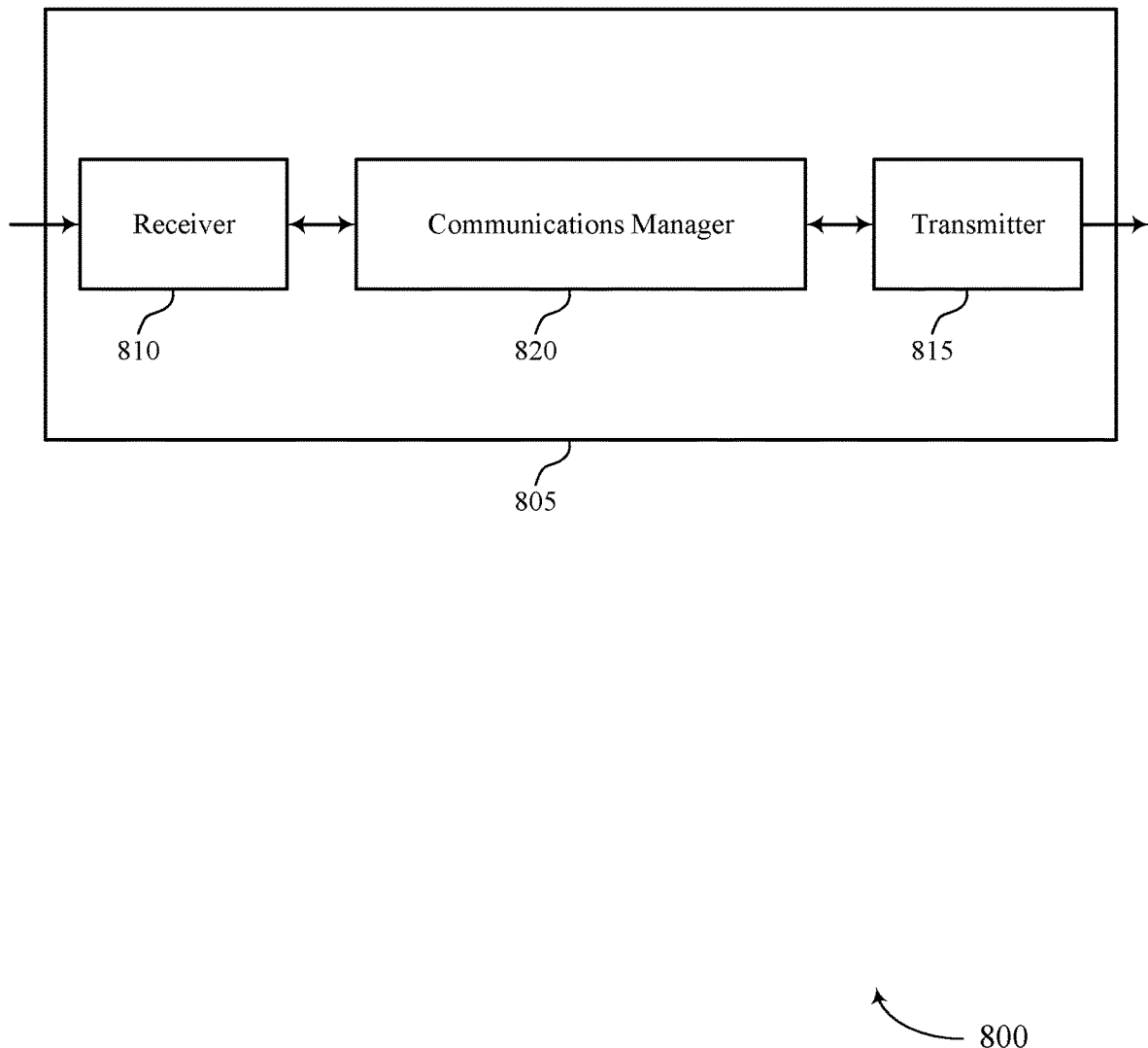
FIGS. 8 and 9 show block diagrams of devices that support reporting configurations for CLI based CSI in accordance with one or more aspects of the present disclosure.

FIG. 8 shows a block diagram 800 of a device 805 that supports reporting configurations for CLI based CSI in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to reporting configurations for CLI based CSI). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to reporting configurations for CLI based CSI). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of reporting configurations for CLI based CSI as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a first UE in accordance with examples as disclosed herein. For example, the communications manager 820 may be configured as or otherwise support a means for receiving a control message that indicates a reporting configuration for indicating CSI, where the CSI is associated with a channel between the first UE and a network entity. The communications manager 820 may be configured as or otherwise support a means for generating the CSI based on at least one precoded CLI channel at the first UE associated with at least one uplink transmission associated with a second UE, the at least one precoded CLI channel generated using at least one estimated cross link interference channel associated with the at least one uplink transmission and at least one candidate precoding matrix of one or more candidate precoding matrices associated with the second UE. The communications manager 820 may be configured as or otherwise support a means for transmitting the CSI in accordance with the reporting configuration.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for mitigating or reducing the impact of CLI based on reporting CSI that considers the impact of CLI which may increase communication reliability and reduce communication failures. As a result, processing and power consumption may be reduced and efficient utilization of communication resources may be increased, for example, reducing retransmissions associated with communication failures and reduced communication reliability.

Figure 9:
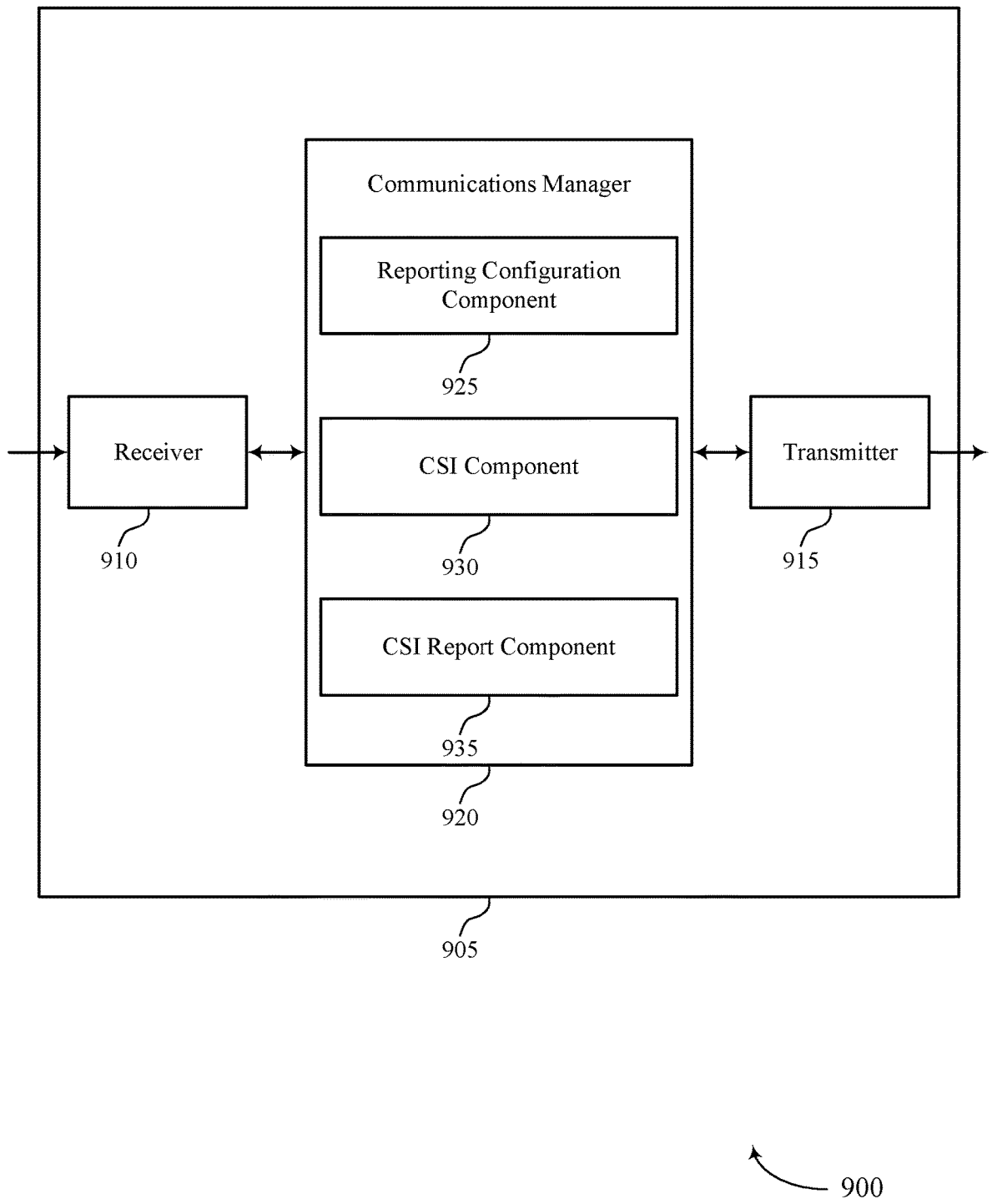

FIG. 9 shows a block diagram 900 of a device 905 that supports reporting configurations for CLI based CSI in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to reporting configurations for CLI based CSI). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to reporting configurations for CLI based CSI). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of reporting configurations for CLI based CSI as described herein. For example, the communications manager 920 may include a reporting configuration component 925, a CSI component 930, a CSI report component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a first UE in accordance with examples as disclosed herein. The reporting configuration component 925 may be configured as or otherwise support a means for receiving a control message that indicates a reporting configuration for indicating CSI, where the CSI is associated with a channel between the first UE and a network entity. The CSI component 930 may be configured as or otherwise support a means for generating the CSI based on at least one precoded CLI channel at the first UE associated with at least one uplink transmission associated with a second UE, the at least one precoded CLI channel generated using at least one estimated CLI channel associated with the at least one uplink transmission and at least one candidate precoding matrix of one or more candidate precoding matrices associated with the second UE. The CSI report component 935 may be configured as or otherwise support a means for transmitting the CSI in accordance with the reporting configuration.

Figure 10:
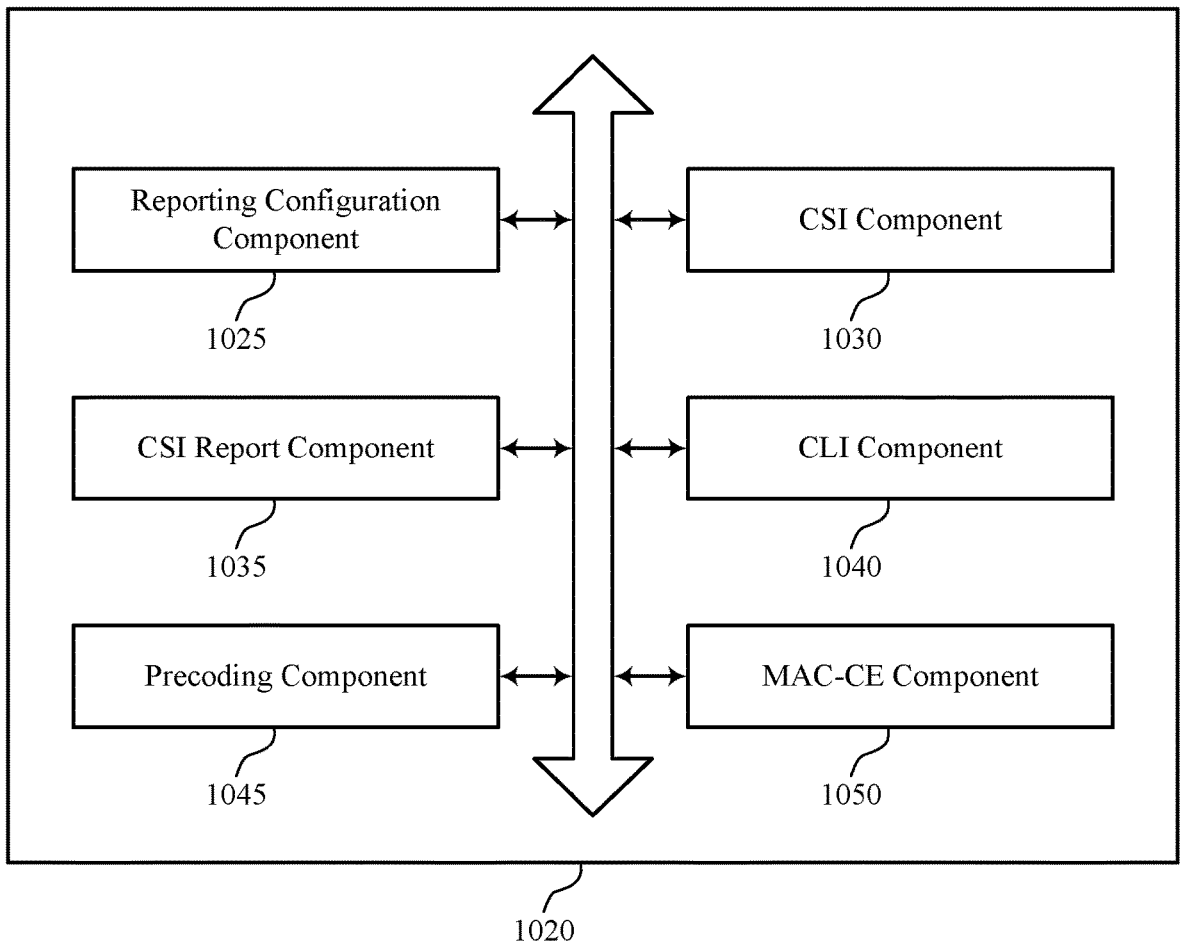
FIG. 10 shows a block diagram of a communications manager that supports reporting configurations for CLI based CSI in accordance with one or more aspects of the present disclosure.

FIG. 10 shows a block diagram 1000 of a communications manager 1020 that supports reporting configurations for CLI based CSI in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of reporting configurations for CLI based CSI as described herein. For example, the communications manager 1020 may include a reporting configuration component 1025, a CSI component 1030, a CSI report component 1035, a CLI component 1040, a precoding component 1045, a MAC-CE component 1050, or any combination thereof. Each of these components may communicate, directly or indirectly, with one another (e.g., via one or more buses).

The communications manager 1020 may support wireless communication at a first UE in accordance with examples as disclosed herein. The reporting configuration component 1025 may be configured as or otherwise support a means for receiving a control message that indicates a reporting configuration for indicating CSI, where the CSI is associated with a channel between the first UE and a network entity. The CSI component 1030 may be configured as or otherwise support a means for generating the CSI based on at least one precoded CLI channel at the first UE associated with at least one uplink transmission associated with a second UE, the at least one precoded CLI channel generated using at least one estimated CLI channel associated with the at least one uplink transmission and at least one candidate precoding matrix of one or more candidate precoding matrices associated with the second UE. The CSI report component 1035 may be configured as or otherwise support a means for transmitting the CSI in accordance with the reporting configuration.

In some examples, to support transmitting the CSI, the CSI report component 1035 may be configured as or otherwise support a means for transmitting a report including the CSI, the report including an indication of the at least one candidate precoding matrix.

In some examples, to support generating the CSI, the CSI component 1030 may be configured as or otherwise support a means for generating the CSI based on the at least one candidate precoding matrix, where the at least one candidate precoding matrix corresponds to a first candidate precoding matrix of the one or more candidate precoding matrices that is associated with a minimum estimated CLI at the first UE relative to CLIs at the first UE that are estimated based on other candidate precoding matrices of the one or more candidate precoding matrices.

In some examples, to support generating the CSI, the CSI component 1030 may be configured as or otherwise support a means for generating the CSI based on the at least one candidate precoding matrix, where the at least one candidate precoding matrix corresponds to a first candidate precoding matrix of the one or more candidate precoding matrices that is associated with a maximum estimated CLI at the first UE relative to CLIs at the first UE that are estimated based on other candidate precoding matrices of the one or more candidate precoding matrices.

In some examples, to support transmitting the report, the CSI report component 1035 may be configured as or otherwise support a means for transmitting the report having a payload whose size is based on including the indication of the at least one candidate precoding matrix.

In some examples, to support transmitting the report, the CSI report component 1035 may be configured as or otherwise support a means for transmitting the indication of the at least one candidate precoding matrix in a field of the report that is associated with reporting one or more types of CSI.

In some examples, the CLI component 1040 may be configured as or otherwise support a means for generating a set of precoded cross link interference channels, each precoded cross link interference channel generated based on an estimated cross link interference channel of a set of cross link interference channels at the first UE corresponding to a set of uplink transmissions associated with the second UE and based on a candidate precoding matrix of the one or more candidate precoding matrices. In some examples, to support generating the CSI, the CSI component 1030 may be configured as or otherwise support a means for generating the channel state information based at least in part on an average of the set of precoded cross link interference channels. In some examples, to support generating the CSI, the CSI component 1030 may be configured as or otherwise support a means for generating channel state information associated with a precoded cross link interference channel associated with a minimum interference with the channel between the first UE and the network entity based at least in part on the set of precoded cross link interference channels.

In some examples, the CLI component 1040 may be configured as or otherwise support a means for generating a set of precoded cross link interference channels, each precoded cross link interference channel generated based on a single estimated cross link interference channel at the first UE corresponding to a single uplink transmission associated with the second UE and based on a set of candidate precoding matrices of the one or more candidate precoding matrices. In some examples, to support generating the CSI, the CSI component 1030 may be configured as or otherwise support a means for generating the channel state information based at least in part on an average of the set of precoded cross link interference channels. In some examples, to support generating the CSI, the CSI component 1030 may be configured as or otherwise support a means for generating CSI associated with a precoded cross link interference channel associated with a minimum interference with the channel between the first UE and the network entity based at least in part on the set of precoded cross link interference channels In some examples, the control message indicates the one or more candidate precoding matrices associated with uplink precoding at the second UE.

In some examples, the control message indicates a first subset of candidate precoding matrices of a set of candidate precoding matrices to exclude in estimating CLI at the first UE. In some examples, the one or more candidate precoding matrices correspond to non-excluded candidate precoding matrices of the set of candidate precoding matrices.

In some examples, the precoding component 1045 may be configured as or otherwise support a means for receiving a second control message that indicates the one or more candidate precoding matrices associated with uplink precoding at the second UE.

In some examples, to support transmitting the CSI, the CSI report component 1035 may be configured as or otherwise support a means for transmitting a report including the CSI, the report including an indication of a set of candidate precoding matrices unused by the first UE to generate the at least one precoded CLI channel at the first UE in association with generating the CSI.

In some examples, the set of candidate precoding matrices corresponds to non-preferred precoding matrices for the second UE to use in precoding the uplink transmission.

In some examples, the reporting configuration indicates a field in the report including the indication of the set of candidate precoding matrices unused by the first UE.

In some examples, the reporting configuration includes an indication that reporting of the set of candidate precoding matrices unused by the first UE is activated.

In some examples, the MAC-CE component 1050 may be configured as or otherwise support a means for transmitting an uplink MAC-CE that indicates a set of candidate precoding matrices unused by the first UE to generate the at least one precoded CLI channel at the first UE in association with generating the CSI.

In some examples, the uplink MAC-CE indicates a set of multiple sets of candidate precoding matrices unused by the first UE to generate the at least one precoded CLI channel at the first UE in association with generating respective CSI, each set of candidate of precoding matrices of the set of multiple sets of candidate precoding matrices corresponding to a respective report including the respective CSI.

In some examples, the uplink MAC-CE indicates a respective identifier of each respective report.

In some examples, the at least one precoded CLI channel at the first UE corresponds to predicted CLI at the first UE if the second UE transmits the uplink transmission using the at least one candidate precoding matrix.

Figure 11:
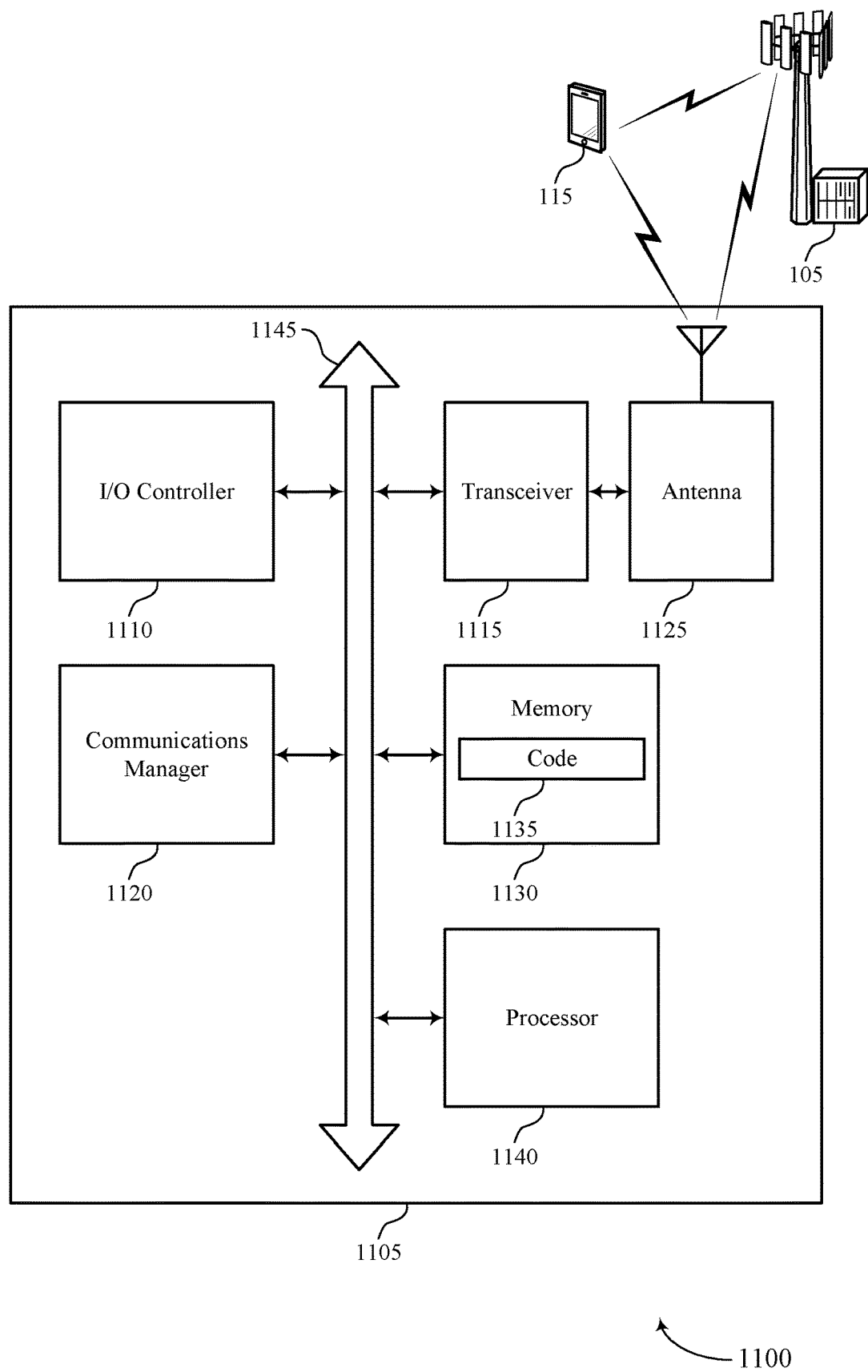
FIG. 11 shows a diagram of a system including a device that supports reporting configurations for CLI based CSI in accordance with one or more aspects of the present disclosure.

FIG. 11 shows a diagram of a system 1100 including a device 1105 that supports reporting configurations for CLI based CSI in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting reporting configurations for CLI based CSI). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communication at a first UE in accordance with examples as disclosed herein. For example, the communications manager 1120 may be configured as or otherwise support a means for receiving a control message that indicates a reporting configuration for indicating CSI, where the CSI is associated with a channel between the first UE and a network entity. The communications manager 1120 may be configured as or otherwise support a means for generating the CSI based on at least one precoded CLI channel at the first UE associated with at least one uplink transmission associated with a second UE, the at least one precoded CLI channel generated using at least one estimated CLI channel associated with the at least one uplink transmission and at least one candidate precoding matrix of one or more candidate precoding matrices associated with the second UE. The communications manager 1120 may be configured as or otherwise support a means for transmitting the CSI in accordance with the reporting configuration.

By including or configuring the communications manager 1120 in accordance with examples as described herein, the device 1105 may support techniques for increased communication reliability, CLI reduction and mitigation (e.g., inter-UE CLI reduction), improved full duplex communication reliability, increased data rates, reduced power consumption, more efficient utilization of communication resources, improved coordination between devices, and longer battery life, among other benefits.

In some examples, the communications manager 1120 may be configured to perform various operations (e.g., receiving, monitoring, transmitting) using or otherwise in cooperation with the transceiver 1115, the one or more antennas 1125, or any combination thereof. For example, the communications manager 1120 may be configured to receive or transmit messages or other signaling as described herein via the transceiver 1115. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of reporting configurations for CLI based CSI as described herein, or the processor 1140 and the memory 1130 may be otherwise configured to perform or support such operations.

Figure 12:
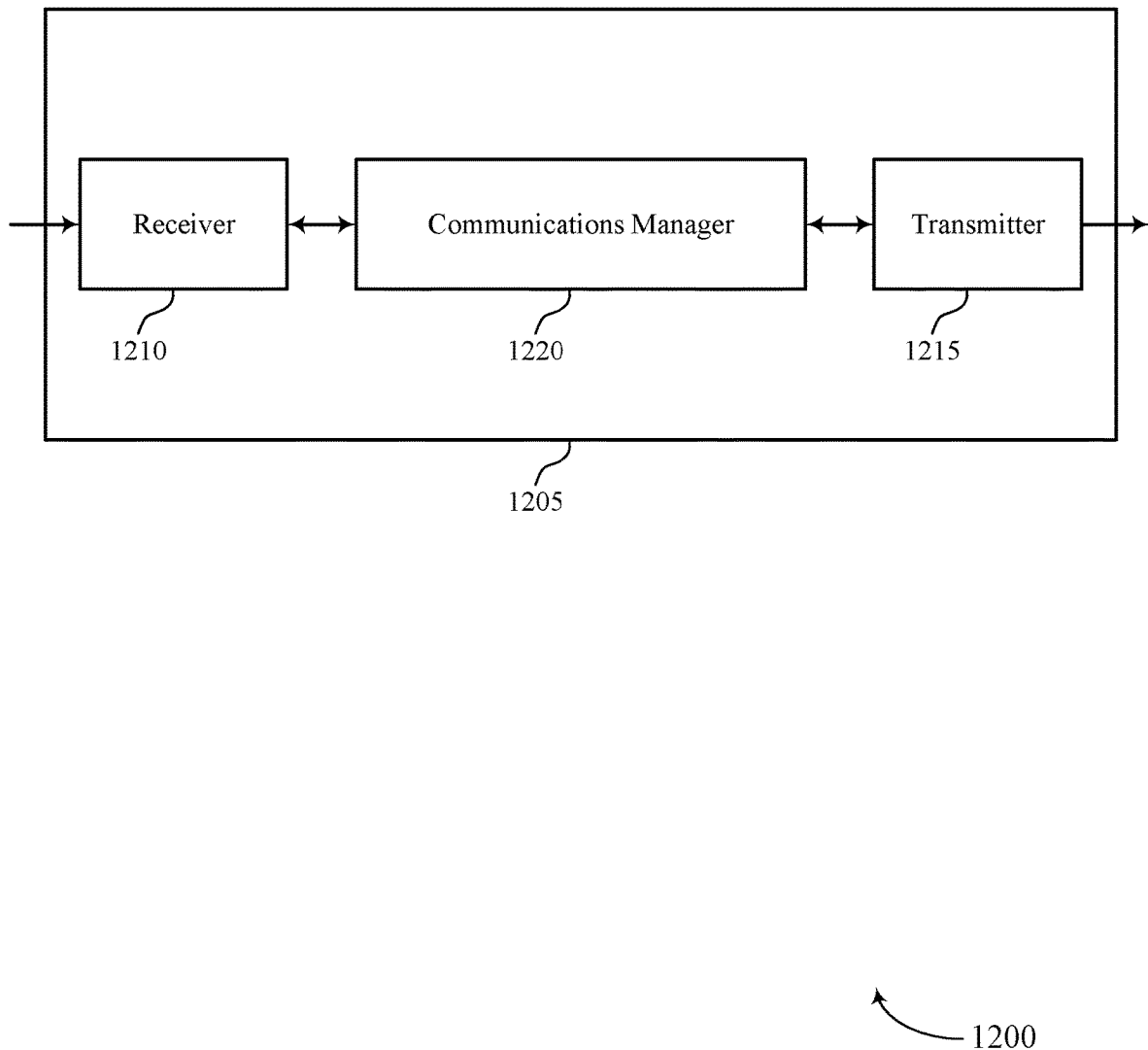
FIGS. 12 and 13 show block diagrams of devices that support reporting configurations for CLI based CSI in accordance with one or more aspects of the present disclosure.

FIG. 12 shows a block diagram 1200 of a device 1205 that supports reporting configurations for CLI based CSI in accordance with one or more aspects of the present disclosure. The device 1205 may be an example of aspects of a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of reporting configurations for CLI based CSI as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a network entity in accordance with examples as disclosed herein. For example, the communications manager 1220 may be configured as or otherwise support a means for outputting a control message that indicates a reporting configuration for indicating CSI, where the CSI is associated with a channel between a first UE and the network entity. The communications manager 1220 may be configured as or otherwise support a means for obtaining the CSI in accordance with the reporting configuration, where the CSI is based on at least one candidate precoding matrix of one or more candidate precoding matrices associated with uplink precoding at a second UE and at least one precoded CLI channel at the first UE associated with an uplink transmission associated with the second UE.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques for mitigating or reducing the impact of CLI based on reporting CSI that considers the impact of CLI which may increase communication reliability and reduce communication failures. As a result, processing and power consumption may be reduced and efficient utilization of communication resources may be increased, for example, reducing retransmissions associated with communication failures and reduced communication reliability.

Figure 13:
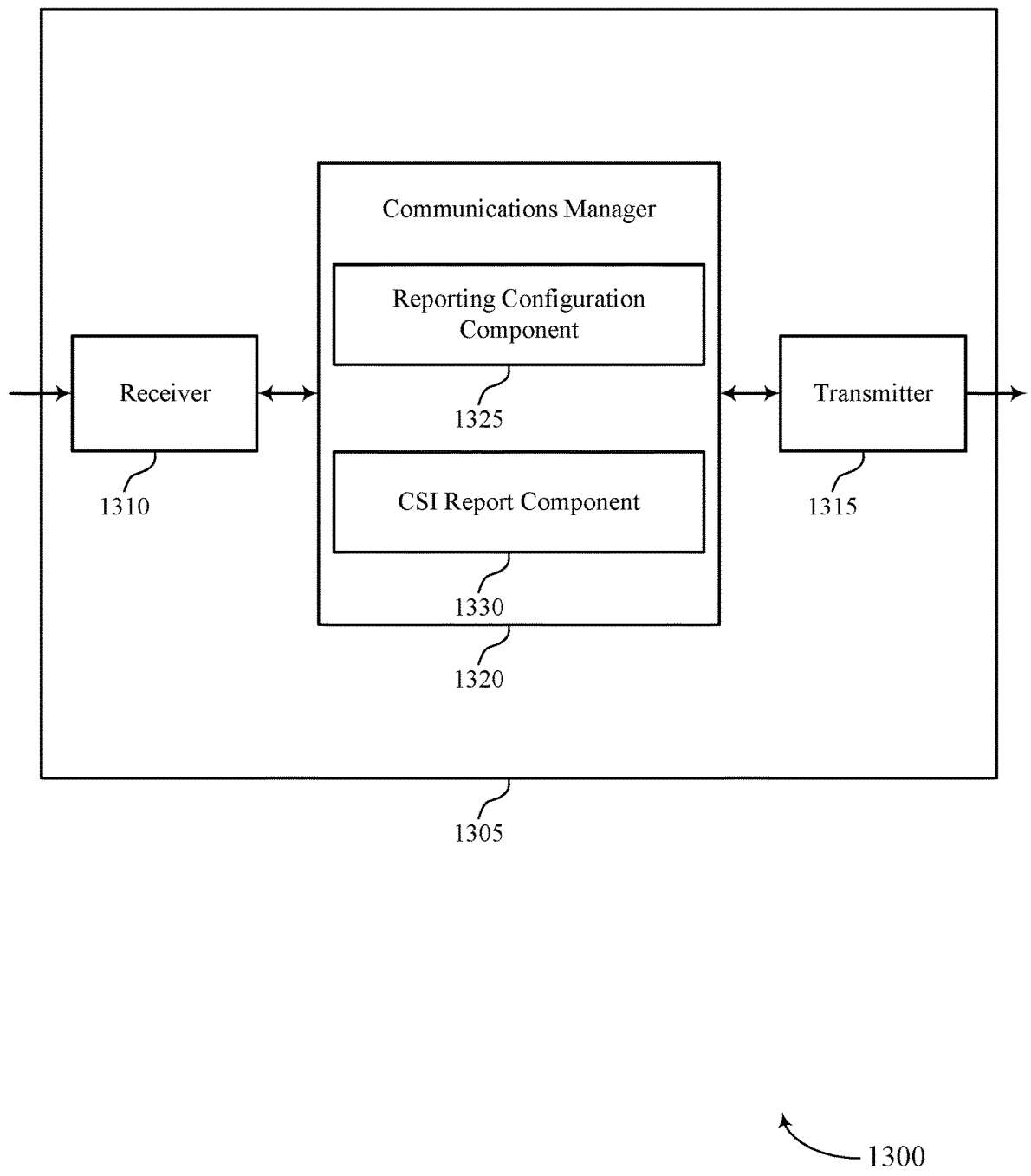

FIG. 13 shows a block diagram 1300 of a device 1305 that supports reporting configurations for CLI based CSI in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of reporting configurations for CLI based CSI as described herein. For example, the communications manager 1320 may include a reporting configuration component 1325 a CSI report component 1330, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication at a network entity in accordance with examples as disclosed herein. The reporting configuration component 1325 may be configured as or otherwise support a means for outputting a control message that indicates a reporting configuration for indicating CSI, where the CSI is associated with a channel between a first UE and the network entity. The CSI report component 1330 may be configured as or otherwise support a means for obtaining the CSI in accordance with the reporting configuration, where the CSI is based on at least one candidate precoding matrix one or more candidate precoding matrices associated with uplink precoding at a second UE and at least one precoded CLI channel at the first UE associated with an uplink transmission associated with the second UE.

Figure 14:
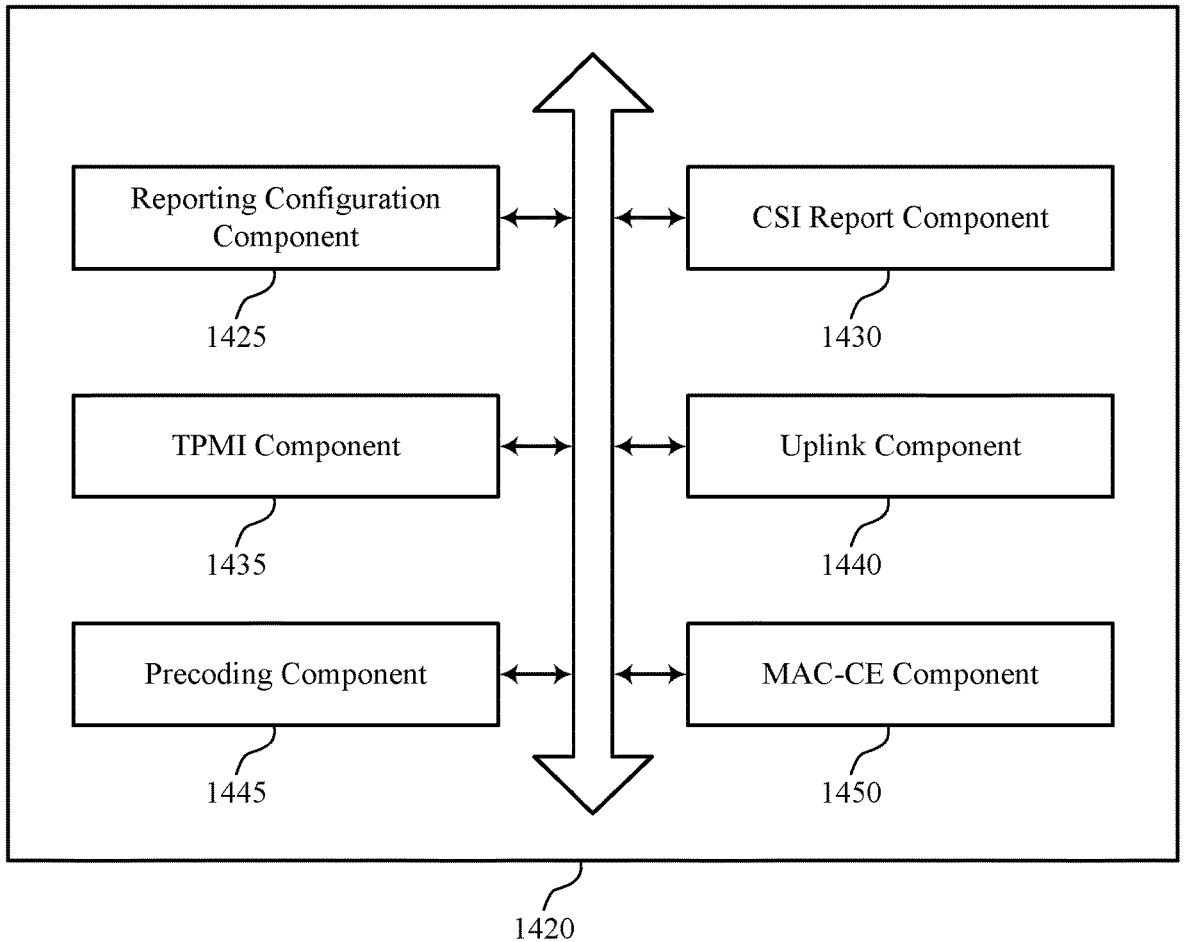
FIG. 14 shows a block diagram of a communications manager that supports reporting configurations for CLI based CSI in accordance with one or more aspects of the present disclosure.

FIG. 14 shows a block diagram 1400 of a communications manager 1420 that supports reporting configurations for CLI based CSI in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of reporting configurations for CLI based CSI as described herein. For example, the communications manager 1420 may include a reporting configuration component 1425, a CSI report component 1430, a TPMI component 1435, an uplink component 1440, a precoding component 1445, a MAC-CE component 1450, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof The communications manager 1420 may support wireless communication at a network entity in accordance with examples as disclosed herein. The reporting configuration component 1425 may be configured as or otherwise support a means for outputting a control message that indicates a reporting configuration for indicating CSI, where the CSI is associated with a channel between a first UE and the network entity. The CSI report component 1430 may be configured as or otherwise support a means for obtaining the CSI in accordance with the reporting configuration, where the CSI is based on at least one candidate precoding matrix of one or more candidate precoding matrices associated with uplink precoding at a second UE and at least one precoded CLI channel at the first UE associated with an uplink transmission associated with the second UE.

In some examples, the TPMI component 1435 may be configured as or otherwise support a means for outputting a second control message that includes a TPMI for the uplink transmission associated with the second UE, the TPMI based on the CSI. In some examples, the uplink component 1440 may be configured as or otherwise support a means for obtaining the uplink transmission associated with the second UE in accordance with the TPMI.

In some examples, to support obtaining the CSI, the CSI report component 1430 may be configured as or otherwise support a means for obtaining a report including the CSI, the report including an indication of the at least one candidate precoding matrix.

In some examples, the candidate precoding matrix corresponds to a first candidate precoding matrix of the one or more candidate precoding matrices that is associated with a minimum estimated CLI at the first UE relative to CLIs at the first UE estimated based on other candidate precoding matrices of the one or more candidate precoding matrices.

In some examples, the candidate precoding matrix corresponds to a first candidate precoding matrix of the one or more candidate precoding matrices that is associated with a maximum estimated CLI at the first UE relative to CLIs at the first UE estimated based on other candidate precoding matrices of the one or more candidate precoding matrices.

In some examples, a size of a payload of the report is based on including the indication of the at least one candidate precoding matrix.

In some examples, the indication of the at least one candidate precoding matrix is obtained in a field of the report that is associated with reporting one or more types of CSI.

In some examples, the control message indicates the one or more candidate precoding matrices associated with uplink precoding at the second UE.

In some examples, the control message indicates a first subset of candidate precoding matrices of a set of candidate precoding matrices to exclude in estimating CLI at the first UE. In some examples, the one or more candidate precoding matrices correspond to non-excluded candidate precoding matrices of the set of candidate precoding matrices.

In some examples, the precoding component 1445 may be configured as or otherwise support a means for outputting a second control message that indicates the one or more candidate precoding matrices associated with uplink precoding at the second UE.

In some examples, to support obtaining the CSI, the CSI report component 1430 may be configured as or otherwise support a means for obtaining a report including the CSI, the report including an indication of a set of candidate precoding matrices unused by the first UE to generate the at least one precoded CLI channel at the first UE in association with generating the CSI.

In some examples, the set of candidate precoding matrices corresponds to non-preferred precoding matrices for the second UE to use in precoding the uplink transmission.

In some examples, the reporting configuration indicates a field in the report including the indication of the set of candidate precoding matrices unused by the first UE.

In some examples, the reporting configuration includes an indication that reporting of the set of candidate precoding matrices unused by the first UE is activated.

In some examples, the MAC-CE component 1450 may be configured as or otherwise support a means for obtaining an uplink MAC-CE that indicates a set of candidate precoding matrices unused by the first UE to generate the at least one precoded CLI channel at the first UE in association with generating the CSI.

In some examples, the uplink MAC-CE indicates a set of multiple sets of candidate precoding matrices unused by the first UE to generate at least one CLI channel at the first UE in association with generating respective CSI, each set of candidate of precoding matrices of the set of multiple sets of candidate precoding matrices corresponding to a respective report including the respective CSI.

In some examples, the uplink MAC-CE indicates a respective identifier of each respective report.

Figure 15:
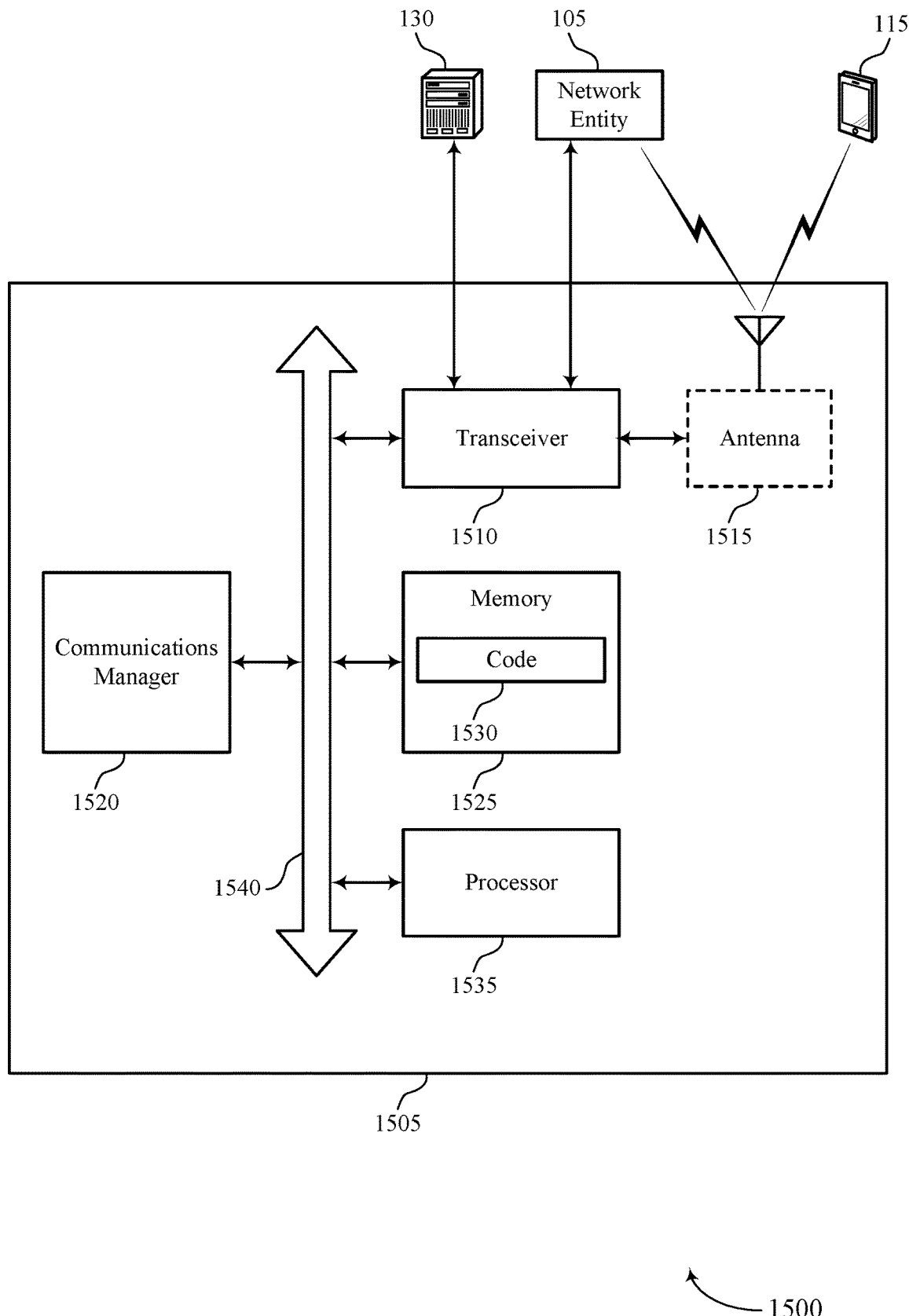
FIG. 15 shows a diagram of a system including a device that supports reporting configurations for CLI based CSI in accordance with one or more aspects of the present disclosure.

FIG. 15 shows a diagram of a system 1500 including a device 1505 that supports reporting configurations for CLI based CSI in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications via one or more wired interfaces, via one or more wireless interfaces, or any combination thereof. The device 1505 may include components that support outputting and obtaining communications, such as a communications manager 1520, a transceiver 1510, an antenna 1515, a memory 1525, code 1530, and a processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. The transceiver 1510, or the transceiver 1510 and one or more antennas 1515 or wired interfaces, where applicable, may be an example of a transmitter 1215, a transmitter 1315, a receiver 1210, a receiver 1310, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1525 may include RAM and ROM. The memory 1525 may store computer-readable, computer-executable code 1530 including instructions that, when executed by the processor 1535, cause the device 1505 to perform various functions described herein. The code 1530 may be stored in a non-transitory computer-readable medium such as system memory or another type of memory. In some cases, the code 1530 may not be directly executable by the processor 1535 but may cause a computer (e.g., when compiled and executed) to perform functions described herein. In some cases, the memory 1525 may contain, among other things, a BIOS which may control basic hardware or software operation such as the interaction with peripheral components or devices.

The processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1535 may be configured to operate a memory array using a memory controller. In some other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting reporting configurations for CLI based CSI). For example, the device 1505 or a component of the device 1505 may include a processor 1535 and memory 1525 coupled with the processor 1535, the processor 1535 and memory 1525 configured to perform various functions described herein. The processor 1535 may be an example of a cloud-computing platform (e.g., one or more physical nodes and supporting software such as operating systems, virtual machines, or container instances) that may host the functions (e.g., by executing code 1530) to perform the functions of the device 1505.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the memory 1525, the code 1530, and the processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communication at a network entity in accordance with examples as disclosed herein. For example, the communications manager 1520 may be configured as or otherwise support a means for outputting a control message that indicates a reporting configuration for indicating CSI, where the CSI is associated with a channel between a first UE and the network entity. The communications manager 1520 may be configured as or otherwise support a means for obtaining the CSI in accordance with the reporting configuration, where the CSI is based on at least one candidate precoding matrix of one or more candidate precoding matrices associated with uplink precoding at a second UE and at least one precoded CLI channel at the first UE associated with an uplink transmission associated with the second UE.

By including or configuring the communications manager 1520 in accordance with examples as described herein, the device 1505 may support techniques for increased communication reliability, CLI reduction and mitigation (e.g., inter-UE CLI reduction), improved full duplex communication reliability, increased data rates, reduced power consumption, more efficient utilization of communication resources, improved coordination between devices, and longer battery life, among other benefits.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. For example, the communications manager 1520 may be configured to receive or transmit messages or other signaling as described herein via the transceiver 1510. Although the communications manager 1520 is illustrated as a separate component, in some examples, one or more functions described with reference to the communications manager 1520 may be supported by or performed by the processor 1535, the memory 1525, the code 1530, the transceiver 1510, or any combination thereof. For example, the code 1530 may include instructions executable by the processor 1535 to cause the device 1505 to perform various aspects of reporting configurations for CLI based CSI as described herein, or the processor 1535 and the memory 1525 may be otherwise configured to perform or support such operations.

Figure 16:
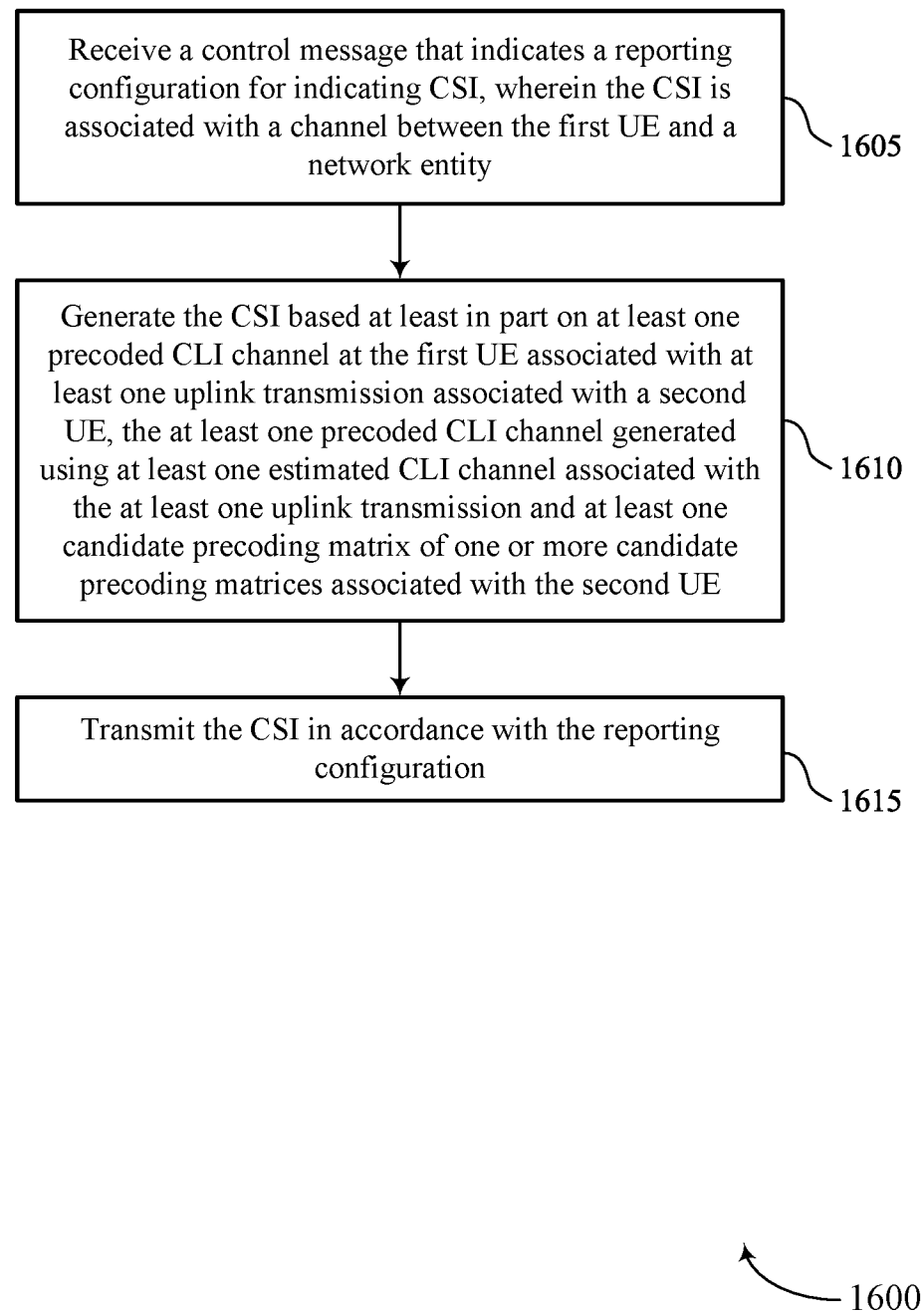
FIGS. 16 through 22 show flowcharts illustrating methods that support reporting configurations for CLI based CSI in accordance with one or more aspects of the present disclosure.

FIG. 16 shows a flowchart illustrating a method 1600 that supports reporting configurations for CLI based CSI in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving a control message that indicates a reporting configuration for indicating CSI, where the CSI is associated with a channel between the first UE and a network entity. The operations of 1605 may be performed in accordance with examples as disclosed herein. In some examples, aspects of the operations of 1605 may be performed by a reporting configuration component 1025 as described with reference to FIG. 10. Additionally or alternatively, means for performing 1605 may, but not necessarily, include, for example, antenna 1125, transceiver 1115, communications manager 1120, memory 1130 (including code 1135), processor 1140 and/or bus 1145.

At 1610, the method may include generating the CSI based on at least one precoded CLI channel at the first UE associated with at least one uplink transmission associated with a second UE, the at least one precoded CLI channel generated using at least one estimated CLI channel associated with the at least one uplink transmission and at least one candidate precoding matrix of one or more candidate precoding matrices associated with the second UE. The operations of 1610 may be performed in accordance with examples as disclosed herein. In some examples, aspects of the operations of 1610 may be performed by a CSI component 1030 as described with reference to FIG. 10. Additionally or alternatively, means for performing 1610 may, but not necessarily, include, for example, antenna 1125, transceiver 1115, communications manager 1120, memory 1130 (including code 1135), processor 1140 and/or bus 1145.

At 1615, the method may include transmitting the CSI in accordance with the reporting configuration. The operations of 1615 may be performed in accordance with examples as disclosed herein. In some examples, aspects of the operations of 1615 may be performed by a CSI report component 1035 as described with reference to FIG. 10. Additionally or alternatively, means for performing 1615 may, but not necessarily, include, for example, antenna 1125, transceiver 1115, communications manager 1120, memory 1130 (including code 1135), processor 1140 and/or bus 1145.

Figure 17:
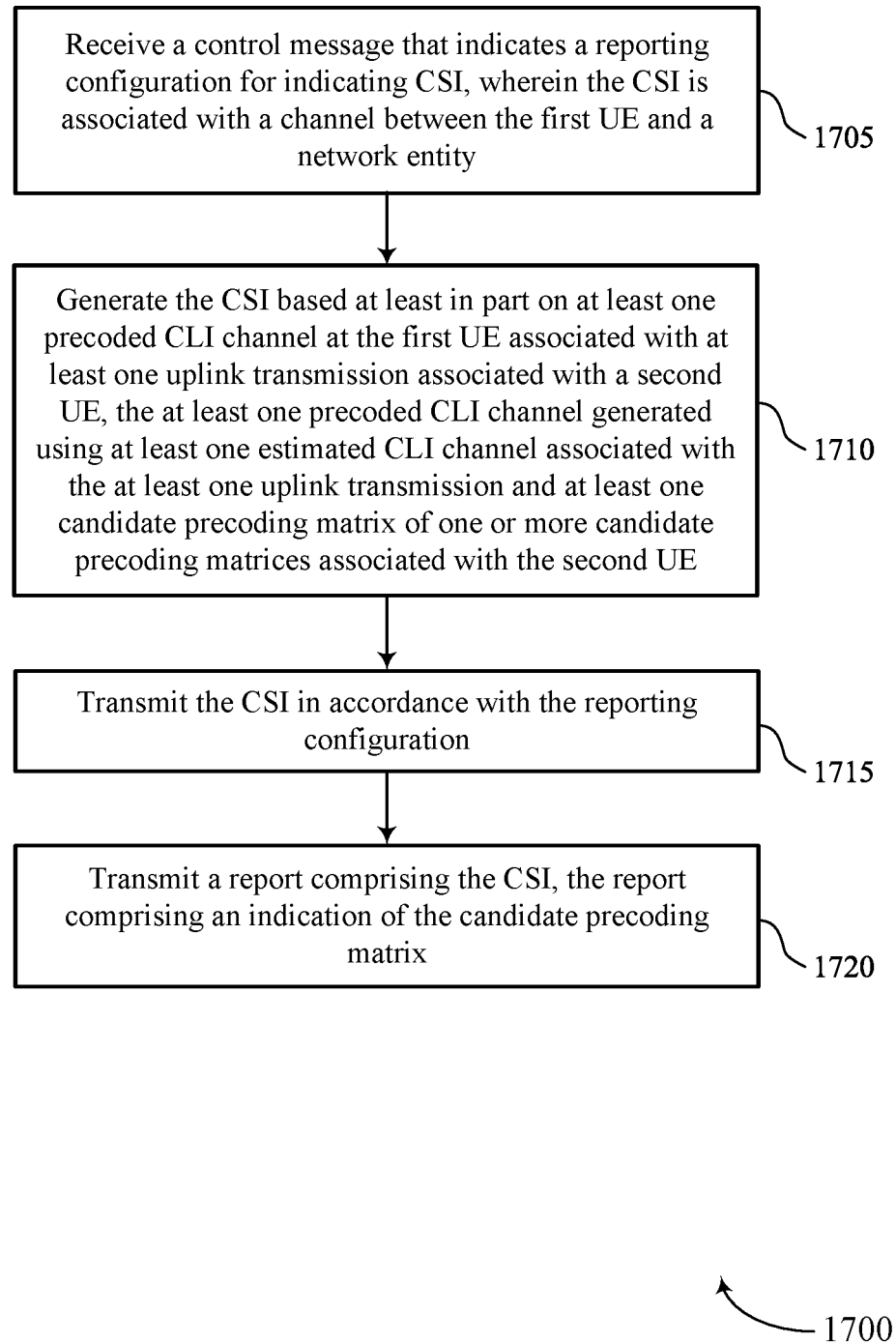

FIG. 17 shows a flowchart illustrating a method 1700 that supports reporting configurations for CLI based CSI in accordance with one or more aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include receiving a control message that indicates a reporting configuration for indicating CSI, where the CSI is associated with a channel between the first UE and a network entity. The operations of 1705 may be performed in accordance with examples as disclosed herein. In some examples, aspects of the operations of 1705 may be performed by a reporting configuration component 1025 as described with reference to FIG. 10. Additionally or alternatively, means for performing 1705 may, but not necessarily, include, for example, antenna 1125, transceiver 1115, communications manager 1120, memory 1130 (including code 1135), processor 1140 and/or bus 1145.

At 1710, the method may include generating the CSI based on at least one precoded CLI channel at the first UE associated with at least one uplink transmission associated with a second UE, the at least one precoded CLI channel generated using at least one estimated CLI channel associated with the at least one uplink transmission and at least one candidate precoding matrix of one or more candidate precoding matrices associated with the second UE. The operations of 1710 may be performed in accordance with examples as disclosed herein. In some examples, aspects of the operations of 1710 may be performed by a CSI component 1030 as described with reference to FIG. 10. Additionally or alternatively, means for performing 1710 may, but not necessarily, include, for example, antenna 1125, transceiver 1115, communications manager 1120, memory 1130 (including code 1135), processor 1140 and/or bus 1145.

At 1715, the method may include transmitting the CSI in accordance with the reporting configuration. The operations of 1715 may be performed in accordance with examples as disclosed herein. In some examples, aspects of the operations of 1715 may be performed by a CSI report component 1035 as described with reference to FIG. 10. Additionally or alternatively, means for performing 1715 may, but not necessarily, include, for example, antenna 1125, transceiver 1115, communications manager 1120, memory 1130 (including code 1135), processor 1140 and/or bus 1145.

At 1720, to support transmitting the CSI, the method may include transmitting a report including the CSI, the report including an indication of the candidate precoding matrix. The operations of 1720 may be performed in accordance with examples as disclosed herein. In some examples, aspects of the operations of 1720 may be performed by a CSI report component 1035 as described with reference to FIG. 10. Additionally or alternatively, means for performing 1720 may, but not necessarily, include, for example, antenna 1125, transceiver 1115, communications manager 1120, memory 1130 (including code 1135), processor 1140 and/or bus 1145.

Figure 18:
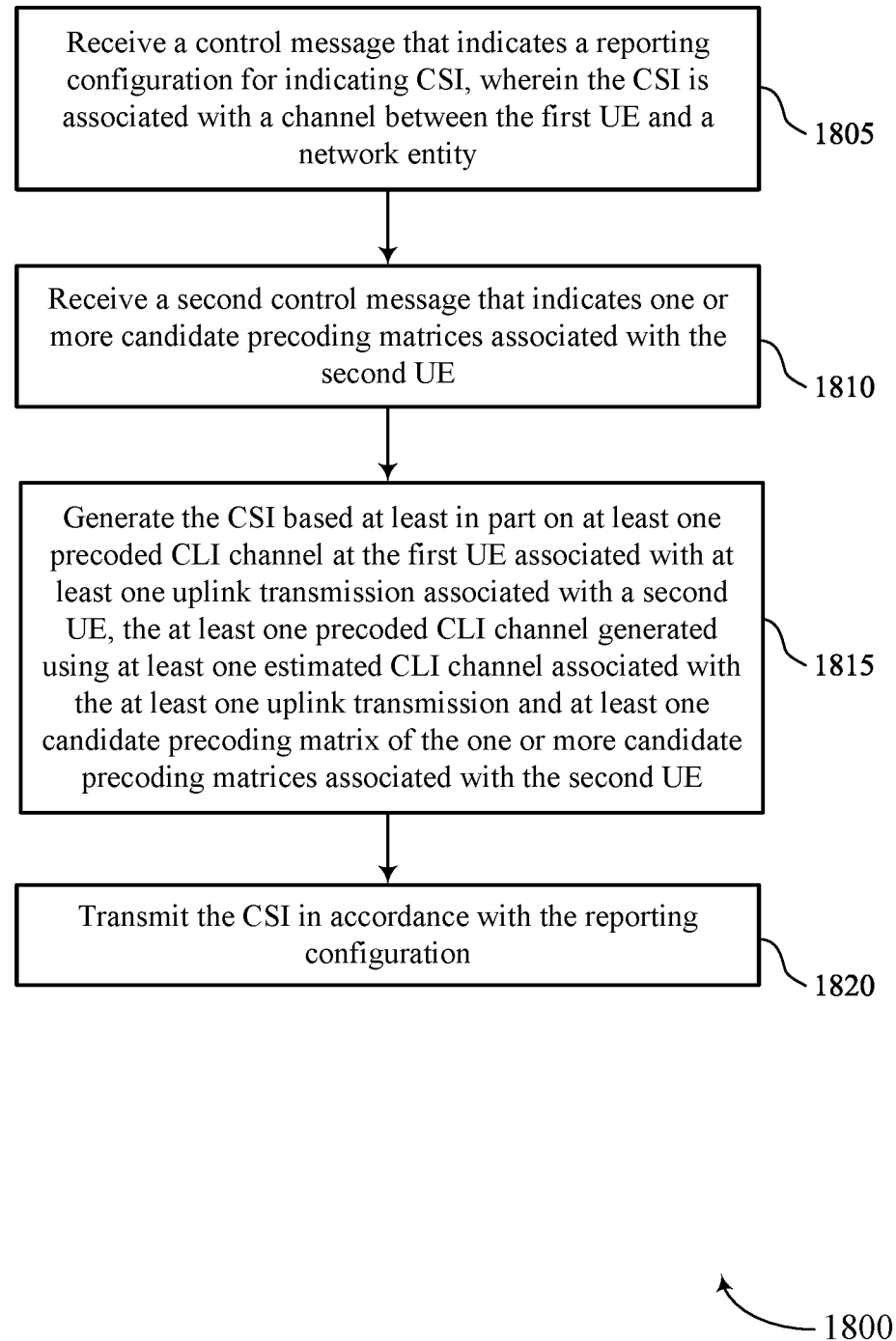

FIG. 18 shows a flowchart illustrating a method 1800 that supports reporting configurations for CLI based CSI in accordance with one or more aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1805, the method may include receiving a control message that indicates a reporting configuration for indicating CSI, where the CSI is associated with a channel between the first UE and a network entity. The operations of 1805 may be performed in accordance with examples as disclosed herein. In some examples, aspects of the operations of 1805 may be performed by a reporting configuration component 1025 as described with reference to FIG. 10. Additionally or alternatively, means for performing 1805 may, but not necessarily, include, for example, antenna 1125, transceiver 1115, communications manager 1120, memory 1130 (including code 1135), processor 1140 and/or bus 1145.

At 1810, the method may include receiving a second control message that indicates one or more candidate precoding matrices associated with the second UE. The operations of 1810 may be performed in accordance with examples as disclosed herein. In some examples, aspects of the operations of 1810 may be performed by a precoding component 1045 as described with reference to FIG. 10. Additionally or alternatively, means for performing 1810 may, but not necessarily, include, for example, antenna 1125, transceiver 1115, communications manager 1120, memory 1130 (including code 1135), processor 1140 and/or bus 1145.

At 1815, the method may include generating the CSI based on at least one precoded CLI channel at the first UE associated with at least one uplink transmission associated with a second UE, the at least one precoded CLI channel generated using at least one estimated CLI channel associated with the at least one uplink transmission and at least one candidate precoding matrix of the one or more candidate precoding matrices associated with the second UE. The operations of 1815 may be performed in accordance with examples as disclosed herein. In some examples, aspects of the operations of 1815 may be performed by a CSI component 1030 as described with reference to FIG. 10. Additionally or alternatively, means for performing 1815 may, but not necessarily, include, for example, antenna 1125, transceiver 1115, communications manager 1120, memory 1130 (including code 1135), processor 1140 and/or bus 1145.

At 1820, the method may include transmitting the CSI in accordance with the reporting configuration. The operations of 1820 may be performed in accordance with examples as disclosed herein. In some examples, aspects of the operations of 1820 may be performed by a CSI report component 1035 as described with reference to FIG. 10. Additionally or alternatively, means for performing 1820 may, but not necessarily, include, for example, antenna 1125, transceiver 1115, communications manager 1120, memory 1130 (including code 1135), processor 1140 and/or bus 1145.

Figure 19:
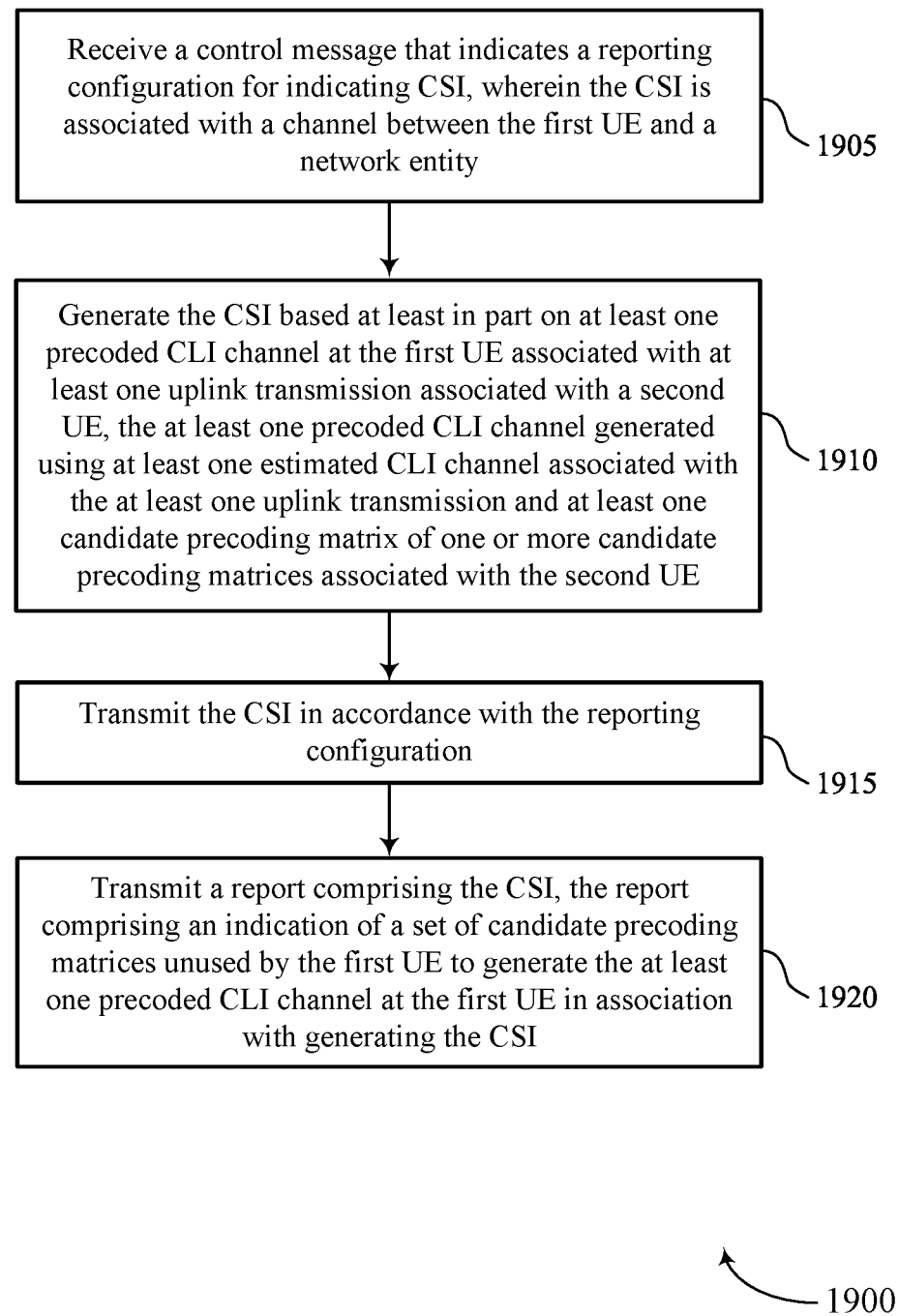

FIG. 19 shows a flowchart illustrating a method 1900 that supports reporting configurations for CLI based CSI in accordance with one or more aspects of the present disclosure. The operations of the method 1900 may be implemented by a UE or its components as described herein. For example, the operations of the method 1900 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1905, the method may include receiving a control message that indicates a reporting configuration for indicating CSI, where the CSI is associated with a channel between the first UE and a network entity. The operations of 1905 may be performed in accordance with examples as disclosed herein. In some examples, aspects of the operations of 1905 may be performed by a reporting configuration component 1025 as described with reference to FIG. 10. Additionally or alternatively, means for performing 1905 may, but not necessarily, include, for example, antenna 1125, transceiver 1115, communications manager 1120, memory 1130 (including code 1135), processor 1140 and/or bus 1145.

At 1910, the method may include generating the CSI based on at least one precoded CLI channel at the first UE associated with at least one uplink transmission associated with a second UE, the at least one precoded CLI channel generated using at least one estimated CLI channel associated with the at least one uplink transmission and at least one candidate precoding matrix of one or more candidate precoding matrices associated with the second UE. The operations of 1910 may be performed in accordance with examples as disclosed herein. In some examples, aspects of the operations of 1910 may be performed by a CSI component 1030 as described with reference to FIG. 10. Additionally or alternatively, means for performing 1910 may, but not necessarily, include, for example, antenna 1125, transceiver 1115, communications manager 1120, memory 1130 (including code 1135), processor 1140 and/or bus 1145.

At 1915, the method may include transmitting the CSI in accordance with the reporting configuration. The operations of 1915 may be performed in accordance with examples as disclosed herein. In some examples, aspects of the operations of 1915 may be performed by a CSI report component 1035 as described with reference to FIG. 10. Additionally or alternatively, means for performing 1915 may, but not necessarily, include, for example, antenna 1125, transceiver 1115, communications manager 1120, memory 1130 (including code 1135), processor 1140 and/or bus 1145.

At 1920, to support transmitting the CSI, the method may include transmitting a report including the CSI, the report including an indication of a set of candidate precoding matrices unused by the first UE to generate the at least one precoded CLI channel at the first UE in association with generating the CSI. The operations of 1920 may be performed in accordance with examples as disclosed herein. In some examples, aspects of the operations of 1920 may be performed by a CSI report component 1035 as described with reference to FIG. 10. Additionally or alternatively, means for performing 1920 may, but not necessarily, include, for example, antenna 1125, transceiver 1115, communications manager 1120, memory 1130 (including code 1135), processor 1140 and/or bus 1145.

Figure 20:
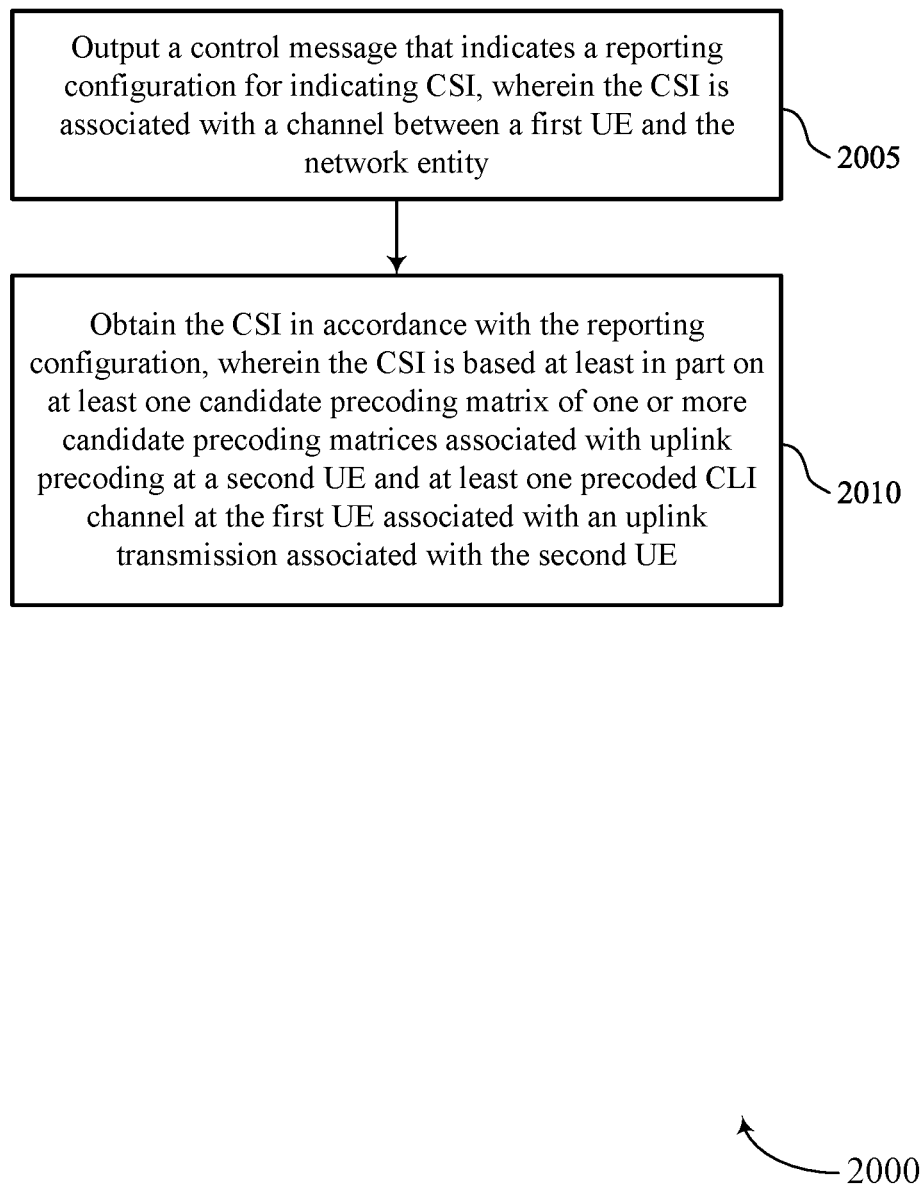

FIG. 20 shows a flowchart illustrating a method 2000 that supports reporting configurations for CLI based CSI in accordance with one or more aspects of the present disclosure. The operations of the method 2000 may be implemented by a network entity or its components as described herein. For example, the operations of the method 2000 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2005, the method may include outputting a control message that indicates a reporting configuration for indicating CSI, where the CSI is associated with a channel between a first UE and the network entity. The operations of 2005 may be performed in accordance with examples as disclosed herein. In some examples, aspects of the operations of 2005 may be performed by a reporting configuration component 1425 as described with reference to FIG. 14. Additionally or alternatively, means for performing 2005 may, but not necessarily, include, for example, antenna 1515, transceiver 1510, communications manager 1520, memory 1525 (including code 1530), processor 1535 and/or bus 1540.

At 2010, the method may include obtaining the CSI in accordance with the reporting configuration, where the CSI is based on at least one candidate precoding matrix of one or more candidate precoding matrices associated with uplink precoding at a second UE and at least one precoded CLI channel at the first UE associated with an uplink transmission associated with the second UE. The operations of 2010 may be performed in accordance with examples as disclosed herein. In some examples, aspects of the operations of 2010 may be performed by a CSI report component 1430 as described with reference to FIG. 14. Additionally or alternatively, means for performing 2010 may, but not necessarily, include, for example, antenna 1515, transceiver 1510, communications manager 1520, memory 1525 (including code 1530), processor 1535 and/or bus 1540.

Figure 21:
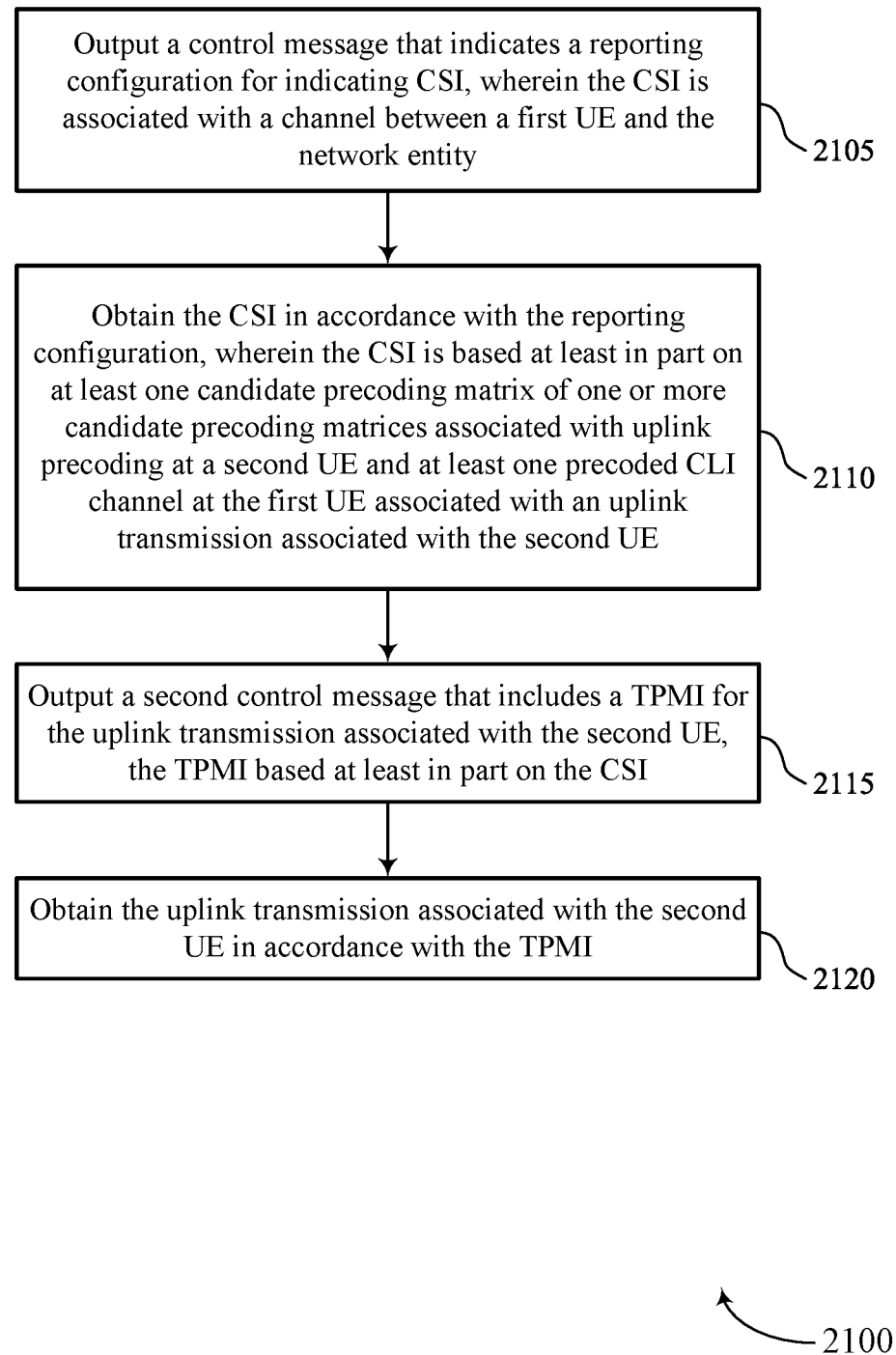

FIG. 21 shows a flowchart illustrating a method 2100 that supports reporting configurations for CLI based CSI in accordance with one or more aspects of the present disclosure. The operations of the method 2100 may be implemented by a network entity or its components as described herein. For example, the operations of the method 2100 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2105, the method may include outputting a control message that indicates a reporting configuration for indicating CSI, where the CSI is associated with a channel between a first UE and the network entity. The operations of 2105 may be performed in accordance with examples as disclosed herein. In some examples, aspects of the operations of 2105 may be performed by a reporting configuration component 1425 as described with reference to FIG. 14. Additionally or alternatively, means for performing 2105 may, but not necessarily, include, for example, antenna 1515, transceiver 1510, communications manager 1520, memory 1525 (including code 1530), processor 1535 and/or bus 1540.

At 2110, the method may include obtaining the CSI in accordance with the reporting configuration, where the CSI is based on at least one candidate precoding matrix of one or more candidate precoding matrices associated with uplink precoding at a second UE and at least one precoded CLI channel at the first UE associated with an uplink transmission associated with the second UE. The operations of 2110 may be performed in accordance with examples as disclosed herein. In some examples, aspects of the operations of 2110 may be performed by a CSI report component 1430 as described with reference to FIG. 14. Additionally or alternatively, means for performing 2110 may, but not necessarily, include, for example, antenna 1515, transceiver 1510, communications manager 1520, memory 1525 (including code 1530), processor 1535 and/or bus 1540.

At 2115, the method may include outputting a second control message that includes a TPMI for the uplink transmission associated with the second UE, the TPMI based on the CSI. The operations of 2115 may be performed in accordance with examples as disclosed herein. In some examples, aspects of the operations of 2115 may be performed by a TPMI component 1435 as described with reference to FIG. 14. Additionally or alternatively, means for performing 2115 may, but not necessarily, include, for example, antenna 1515, transceiver 1510, communications manager 1520, memory 1525 (including code 1530), processor 1535 and/or bus 1540.

At 2120, the method may include obtaining the uplink transmission associated with the second UE in accordance with the TPMI. The operations of 2120 may be performed in accordance with examples as disclosed herein. In some examples, aspects of the operations of 2120 may be performed by an uplink component 1440 as described with reference to FIG. 14. Additionally or alternatively, means for performing 2120 may, but not necessarily, include, for example, antenna 1515, transceiver 1510, communications manager 1520, memory 1525 (including code 1530), processor 1535 and/or bus 1540.

Figure 22:
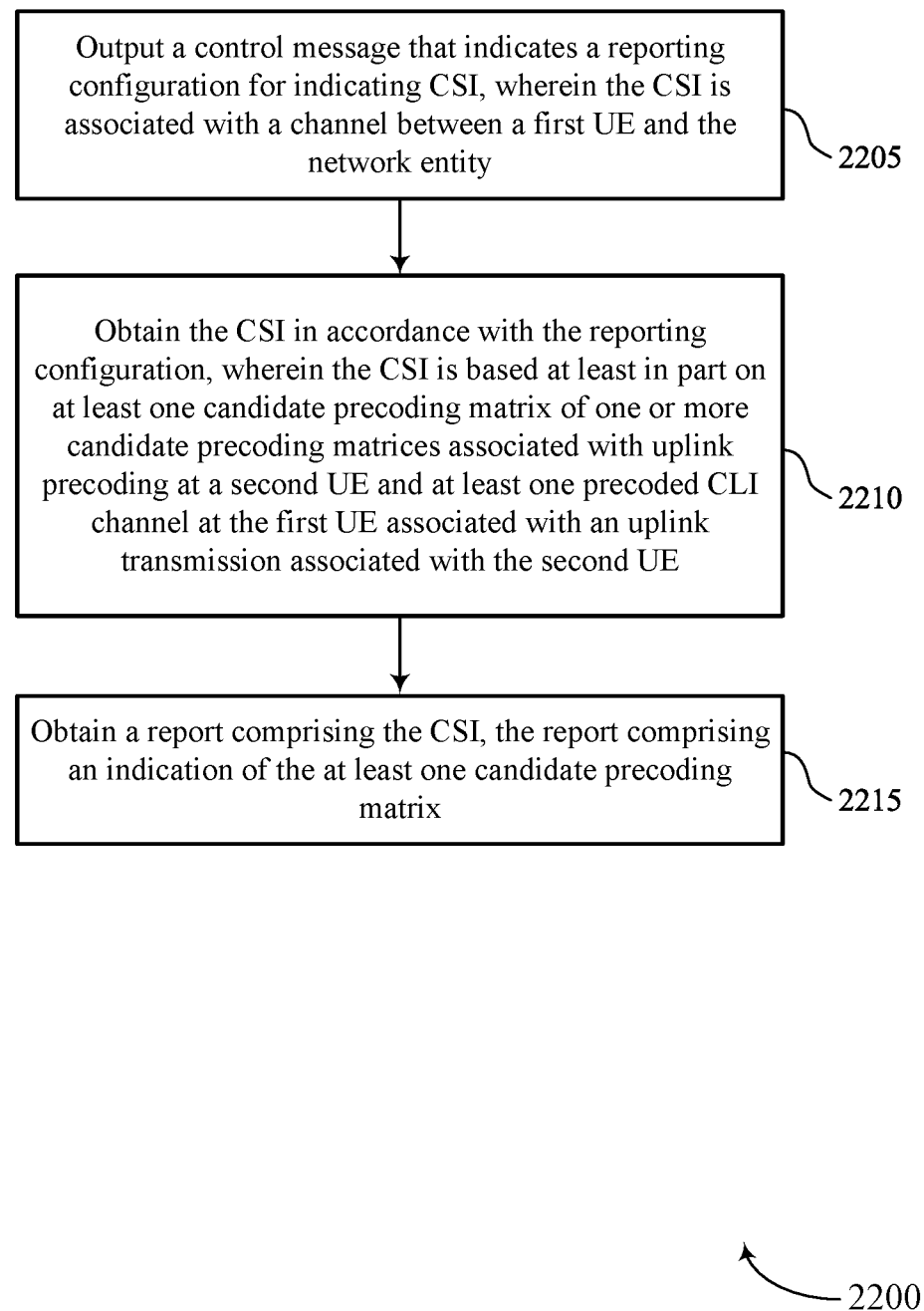

FIG. 22 shows a flowchart illustrating a method 2200 that supports reporting configurations for CLI based CSI in accordance with one or more aspects of the present disclosure. The operations of the method 2200 may be implemented by a network entity or its components as described herein. For example, the operations of the method 2200 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2205, the method may include outputting a control message that indicates a reporting configuration for indicating CSI, where the CSI is associated with a channel between a first UE and the network entity. The operations of 2205 may be performed in accordance with examples as disclosed herein. In some examples, aspects of the operations of 2205 may be performed by a reporting configuration component 1425 as described with reference to FIG. 14. Additionally or alternatively, means for performing 2205 may, but not necessarily, include, for example, antenna 1515, transceiver 1510, communications manager 1520, memory 1525 (including code 1530), processor 1535 and/or bus 1540.

At 2210, the method may include obtaining the CSI in accordance with the reporting configuration, where the CSI is based on at least one candidate precoding matrix of one or more candidate precoding matrices associated with uplink precoding at a second UE and at least one precoded CLI channel at the first UE associated with an uplink transmission associated with the second UE. The operations of 2210 may be performed in accordance with examples as disclosed herein. In some examples, aspects of the operations of 2210 may be performed by a CSI report component 1430 as described with reference to FIG. 14. Additionally or alternatively, means for performing 2210 may, but not necessarily, include, for example, antenna 1515, transceiver 1510, communications manager 1520, memory 1525 (including code 1530), processor 1535 and/or bus 1540.

At 2215, to support obtaining the CSI, the method may include obtaining a report including the CSI, the report including an indication of the at least one candidate precoding matrix. The operations of 2215 may be performed in accordance with examples as disclosed herein. In some examples, aspects of the operations of 2215 may be performed by a CSI report component 1430 as described with reference to FIG. 14. Additionally or alternatively, means for performing 2215 may, but not necessarily, include, for example, antenna 1515, transceiver 1510, communications manager 1520, memory 1525 (including code 1530), processor 1535 and/or bus 1540.

The following provides an overview of aspects of the present disclosure:

Aspect 1: A method for wireless communication at a first UE, comprising: receiving a control message that indicates a reporting configuration for indicating CSI, wherein the CSI is associated with a channel between the first UE and a network entity; generating the CSI based at least in part on at least one precoded CLI channel at the first UE associated with at least one uplink transmission associated with a second UE, the at least one precoded CLI channel generated using at least one estimated CLI channel associated with the at least one uplink transmission and at least one candidate precoding matrix of one or more candidate precoding matrices associated with the second UE; and transmitting the CSI in accordance with the reporting configuration.

Aspect 2: The method of aspect 1, wherein transmitting the CSI comprises: transmitting a report comprising the CSI, the report comprising an indication of the at least one candidate precoding matrix.

Aspect 3: The method of aspect 2, wherein generating the CSI comprises: generating the CSI based at least in part on the at least one candidate precoding matrix, wherein the at least one candidate precoding matrix corresponds to a first candidate precoding matrix of the one or more candidate precoding matrices that is associated with a minimum estimated CLI at the first UE relative to CLIs at the first UE that are estimated based at least in part on other candidate precoding matrices of the one or more candidate precoding matrices.

Aspect 4: The method of aspect 2, wherein generating the CSI comprises: generating the CSI based at least in part on the at least one candidate precoding matrix, wherein the at least one candidate precoding matrix corresponds to a first candidate precoding matrix of the one or more candidate precoding matrices that is associated with a maximum estimated CLI at the first UE relative to CLIs at the first UE that are estimated based at least in part on other candidate precoding matrices of the one or more candidate precoding matrices.

Aspect 5: The method of any of aspects 2 through 4, wherein transmitting the report comprises: transmitting the report having a payload whose size is based at least in part on including the indication of the at least one candidate precoding matrix.

Aspect 6: The method of any of aspects 2 through 5, wherein transmitting the report comprises: transmitting the indication of the at least one candidate precoding matrix in a field of the report that is associated with reporting one or more types of CSI.

Aspect 7: The method of any of aspects 1 through 6, further comprising: generating a set of precoded CLI channels, each precoded CLI channel generated based on an estimated CLI channel of a set of CLI channels at the first UE corresponding to a set of uplink transmissions associated with the second UE and based on a candidate precoding matrix of the one or more candidate precoding matrices, wherein generating the CSI comprises: generating the CSI based at least in part on an average of the set of precoded CLI channels; or generating CSI associated with a precoded CLI channel associated with a minimum interference with the channel between the first UE and the network entity based at least in part on the set of precoded CLI channels.

Aspect 8: The method of any of aspects 1 through 6, further comprising: generating a set of precoded CLI channels, each precoded CLI channel generated based on a single estimated CLI channel at the first UE corresponding to a single uplink transmission associated with the second UE and based on a set of candidate precoding matrices of the one or more candidate precoding matrices, wherein generating the CSI comprises: generating the CSI based at least in part on an average of the set of precoded CLI channels; or generating CSI associated with a precoded CLI channel associated with a minimum interference with the channel between the first UE and the network entity based at least in part on the set of precoded CLI channels.

Aspect 9: The method of any of aspects 1 through 8, wherein the control message indicates the one or more candidate precoding matrices associated with uplink precoding at the second UE.

Aspect 10: The method of any of aspects 1 through 9, wherein the control message indicates a first subset of candidate precoding matrices of a set of candidate precoding matrices to exclude in estimating CLI at the first UE, and the one or more candidate precoding matrices correspond to non-excluded candidate precoding matrices of the set of candidate precoding matrices.

Aspect 11: The method of any of aspects 1 through 7 and 9 through 10, further comprising: receiving a second control message that indicates the one or more candidate precoding matrices associated with uplink precoding at the second UE.

Aspect 12: The method of any of aspects 1 through 11, wherein transmitting the CSI comprises: transmitting a report comprising the CSI, the report comprising an indication of a set of candidate precoding matrices unused by the first UE to generate the at least one precoded CLI channel at the first UE in association with generating the CSI.

Aspect 13: The method of aspect 12, wherein the set of candidate precoding matrices corresponds to non-preferred precoding matrices for the second UE to use in precoding the uplink transmission.

Aspect 14: The method of any of aspects 12 through 13, wherein the reporting configuration indicates a field in the report including the indication of the set of candidate precoding matrices unused by the first UE.

Aspect 15: The method of any of aspects 12 through 14, wherein the reporting configuration includes an indication that reporting of the set of candidate precoding matrices unused by the first UE is activated.

Aspect 16: The method of any of aspects 1 through 15, further comprising: transmitting an uplink MAC-CE that indicates a set of candidate precoding matrices unused by the first UE to generate the at least one precoded CLI channel at the first UE in association with generating the CSI.

Aspect 17: The method of aspect 16, wherein the uplink MAC-CE indicates a plurality of sets of candidate precoding matrices unused by the first UE to generate the at least one precoded CLI channel at the first UE in association with generating respective CSI, each set of candidate of precoding matrices of the plurality of sets of candidate precoding matrices corresponding to a respective report comprising the respective CSI.

Aspect 18: The method of aspect 17, wherein the uplink MAC-CE indicates a respective identifier of each respective report.

Aspect 19: The method of any of aspects 1 through 18, wherein the at least one precoded CLI channel at the first UE corresponds to predicted CLI at the first UE if the second UE transmits the uplink transmission using the at least one candidate precoding matrix.

Aspect 20: A method for wireless communication at a network entity, comprising: outputting a control message that indicates a reporting configuration for indicating CSI, wherein the CSI is associated with a channel between a first UE and the network entity; and obtaining the CSI in accordance with the reporting configuration, wherein the CSI is based at least in part on at least one candidate precoding matrix of one or more candidate precoding matrices associated with uplink precoding at a second UE and at least one precoded CLI channel at the first UE associated with an uplink transmission associated with the second UE.

Aspect 21: The method of aspect 20, further comprising: outputting a second control message that includes a TPMI for the uplink transmission associated with the second UE, the TPMI based at least in part on the CSI; and obtaining the uplink transmission associated with the second UE in accordance with the TPMI.

Aspect 22: The method of any of aspects 20 through 21, wherein obtaining the CSI comprises: obtaining a report comprising the CSI, the report comprising an indication of the at least one candidate precoding matrix.

Aspect 23: The method of aspect 22, wherein the candidate precoding matrix corresponds to a first candidate precoding matrix of the one or more candidate precoding matrices that is associated with a minimum estimated CLI at the first UE relative to CLIs at the first UE estimated based at least in part on other candidate precoding matrices of the one or more candidate precoding matrices.

Aspect 24: The method of aspect 22, wherein the candidate precoding matrix corresponds to a first candidate precoding matrix of the one or more candidate precoding matrices that is associated with a maximum estimated CLI at the first UE relative to CLIs at the first UE estimated based at least in part on other candidate precoding matrices of the one or more candidate precoding matrices.

Aspect 25: The method of any of aspects 20 through 24, wherein the control message indicates the one or more candidate precoding matrices associated with uplink precoding at the second UE.

Aspect 26: The method of any of aspects 20 through 25, wherein the control message indicates a first subset of candidate precoding matrices of a set of candidate precoding matrices to exclude in estimating CLI at the first UE, and the one or more candidate precoding matrices correspond to non-excluded candidate precoding matrices of the set of candidate precoding matrices.

Aspect 27: The method of any of aspects 20 through 24 and 26, further comprising: outputting a second control message that indicates the one or more candidate precoding matrices associated with uplink precoding at the second UE.

Aspect 28: The method of any of aspects 20 through 27, wherein obtaining the CSI comprises: obtaining a report comprising the CSI, the report comprising an indication of a set of candidate precoding matrices unused by the first UE to generate the at least one precoded CLI channel at the first UE in association with generating the CSI.

Aspect 29: An apparatus for wireless communication, comprising memory; a transceiver; at least one processor of a user equipment (UE), the at least one processor coupled with the memory and the transceiver, and the at least one processor configured to perform a method of any of aspects 1 through 19.

Aspect 30: An apparatus for wireless communication at a first UE, comprising at least one means for performing a method of any of aspects 1 through 19.

Aspect 31: A non-transitory computer-readable medium storing code for wireless communication at a first UE, the code comprising instructions executable by a processor to perform a method of any of aspects 1 through 19.

Aspect 32: An apparatus for wireless communication at a network entity, comprising memory; and at least one processor of a network entity, the at least one processor coupled with the memory, and the at least one processor configured to perform a method of any of aspects 20 through 28.

Aspect 33: An apparatus for wireless communication at a network entity, comprising at least one means for performing a method of any of aspects 20 through 28.

Aspect 34: A non-transitory computer-readable medium storing code for wireless communication at a network entity, the code comprising instructions executable by a processor to perform a method of any of aspects 20 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   receiving a control message that indicates a reporting configuration for indicating channel state information, wherein the channel state information is associated with a channel between the first UE and a network entity;
   generating the channel state information based at least in part on at least one precoded cross link interference channel at the first UE associated with at least one uplink transmission associated with a second UE, the at least one precoded cross link interference channel generated both using at least one estimated cross link interference channel associated with the at least one uplink transmission and using at least one candidate precoding matrix of one or more candidate precoding matrices associated with the second UE; and
   transmitting the channel state information in accordance with the reporting configuration.

2. The method of claim 1, wherein transmitting the channel state information comprises:
   transmitting a report comprising the channel state information, the report comprising an indication of the at least one candidate precoding matrix.

3. The method of claim 2, wherein generating the channel state information comprises:
   generating the channel state information based at least in part on the at least one candidate precoding matrix, wherein the at least one candidate precoding matrix corresponds to a first candidate precoding matrix of the one or more candidate precoding matrices that is associated with a minimum estimated cross link interference at the first UE relative to cross link interferences at the first UE that are estimated based at least in part on other candidate precoding matrices of the one or more candidate precoding matrices.

4. The method of claim 2, wherein generating the channel state information comprises:
   generating the channel state information based at least in part on the at least one candidate precoding matrix, wherein the at least one candidate precoding matrix corresponds to a first candidate precoding matrix of the one or more candidate precoding matrices that is associated with a maximum estimated cross link interference at the first UE relative to cross link interferences at the first UE that are estimated based at least in part on other candidate precoding matrices of the one or more candidate precoding matrices.

5. The method of claim 2, wherein transmitting the report comprises:
   transmitting the report having a payload whose size is based at least in part on including the indication of the at least one candidate precoding matrix.

6. The method of claim 2, wherein transmitting the report comprises:
   transmitting the indication of the at least one candidate precoding matrix in a field of the report that is associated with reporting one or more types of channel state information.

7. The method of claim 1, further comprising:
   generating a set of precoded cross link interference channels, each precoded cross link interference channel generated based on an estimated cross link interference channel of a set of cross link interference channels at the first UE corresponding to a set of uplink transmissions associated with the second UE and based on a candidate precoding matrix of the one or more candidate precoding matrices, wherein generating the channel state information comprises:
   generating the channel state information based at least in part on an average of the set of precoded cross link interference channels; or
   generating channel state information associated with a precoded cross link interference channel associated with a minimum interference with the channel between the first UE and the network entity based at least in part on the set of precoded cross link interference channels.

8. The method of claim 1, further comprising:
   generating a set of precoded cross link interference channels, each precoded cross link interference channel generated based on a single estimated cross link interference channel at the first UE corresponding to a single uplink transmission associated with the second UE and based on a set of candidate precoding matrices of the one or more candidate precoding matrices, wherein generating the channel state information comprises:
   generating the channel state information based at least in part on an average of the set of precoded cross link interference channels; or
   generating channel state information associated with a precoded cross link interference channel associated with a minimum interference with the channel between the first UE and the network entity based at least in part on the set of precoded cross link interference channels.

9. The method of claim 1, wherein the control message indicates the one or more candidate precoding matrices associated with uplink precoding at the second UE.

10. The method of claim 1, wherein:
the control message indicates a first subset of candidate precoding matrices of a set of candidate precoding matrices to exclude in estimating cross link interference at the first UE, and
the one or more candidate precoding matrices correspond to non-excluded candidate precoding matrices of the set of candidate precoding matrices.

11. The method of claim 1, further comprising:
receiving a second control message that indicates the one or more candidate precoding matrices associated with uplink precoding at the second UE.

12. The method of claim 1, wherein transmitting the channel state information comprises:
transmitting a report comprising the channel state information, the report comprising an indication of a set of candidate precoding matrices unused by the first UE to generate the at least one precoded cross link interference channel at the first UE in association with generating the channel state information.

13. The method of claim 12, wherein the set of candidate precoding matrices corresponds to non-preferred precoding matrices for the second UE to use in precoding the uplink transmission.

14. The method of claim 12, wherein the reporting configuration indicates a field in the report including the indication of the set of candidate precoding matrices unused by the first UE.

15. The method of claim 12, wherein the reporting configuration includes an indication that reporting of the set of candidate precoding matrices unused by the first UE is activated.

16. The method of claim 1, further comprising:
transmitting an uplink medium access control-control element that indicates a set of candidate precoding matrices unused by the first UE to generate the at least one precoded cross link interference channel at the first UE in association with generating the channel state information.

17. The method of claim 16, wherein the uplink medium access control-control element indicates a plurality of sets of candidate precoding matrices unused by the first UE to generate the at least one precoded cross link interference channel at the first UE in association with generating respective channel state information, each set of candidate of precoding matrices of the plurality of sets of candidate precoding matrices corresponding to a respective report comprising the respective channel state information.

18. The method of claim 17, wherein the uplink medium access control-control element indicates a respective identifier of each respective report.

19. The method of claim 1, wherein the at least one precoded cross link interference channel at the first UE corresponds to predicted cross link interference at the first UE if the second UE transmits the uplink transmission using the at least one candidate precoding matrix.

20. A method for wireless communication at a network entity, comprising:
outputting a control message that indicates a reporting configuration for indicating channel state information, wherein the channel state information is associated with a channel between a first user equipment (UE) and the network entity; and
obtaining the channel state information in accordance with the reporting configuration, wherein the channel state information is based at least in part on both of at least one candidate precoding matrix of one or more candidate precoding matrices associated with uplink precoding at a second UE and at least one precoded cross link interference channel at the first UE associated with an uplink transmission associated with the second UE.

21. The method of claim 20, further comprising:
outputting a second control message that includes a transmission precoding matrix indicator for the uplink transmission associated with the second UE, the transmission precoding matrix indicator based at least in part on the channel state information; and
obtaining the uplink transmission associated with the second UE in accordance with the transmission precoding matrix indicator.

22. The method of claim 20, wherein obtaining the channel state information comprises:
obtaining a report comprising the channel state information, the report comprising an indication of the at least one candidate precoding matrix.

23. The method of claim 22, wherein the candidate precoding matrix corresponds to a first candidate precoding matrix of the one or more candidate precoding matrices that is associated with a minimum estimated cross link interference at the first UE relative to cross link interferences at the first UE estimated based at least in part on other candidate precoding matrices of the one or more candidate precoding matrices.

24. The method of claim 22, wherein the candidate precoding matrix corresponds to a first candidate precoding matrix of the one or more candidate precoding matrices that is associated with a maximum estimated cross link interference at the first UE relative to cross link interferences at the first UE estimated based at least in part on other candidate precoding matrices of the one or more candidate precoding matrices.

25. The method of claim 20, wherein the control message indicates the one or more candidate precoding matrices associated with uplink precoding at the second UE.

26. The method of claim 20, wherein:
the control message indicates a first subset of candidate precoding matrices of a set of candidate precoding matrices to exclude in estimating cross link interference at the first UE, and
the one or more candidate precoding matrices correspond to non-excluded candidate precoding matrices of the set of candidate precoding matrices.

27. The method of claim 20, further comprising:
outputting a second control message that indicates the one or more candidate precoding matrices associated with uplink precoding at the second UE.

28. The method of claim 20, wherein obtaining the channel state information comprises:
obtaining a report comprising the channel state information, the report comprising an indication of a set of candidate precoding matrices unused by the first UE to generate the at least one precoded cross link interference channel at the first UE in association with generating the channel state information.

29. An apparatus for wireless communication, comprising:
memory;
a transceiver; and at least one processor of a first user equipment (UE), the at least one processor coupled with the memory and the transceiver, and the at least one processor configured to:
- receive, via the transceiver, a control message that indicates a reporting configuration for indicating channel state information, wherein the channel state information is associated with a channel between the first UE and a network entity;
- generate the channel state information based at least in part on a precoded cross link interference channel at the first UE associated with at least one uplink transmission associated with a second UE, the precoded cross link interference channel generated both using at least one estimated cross link interference channel associated with the at least one uplink transmission and at least one candidate precoding matrix of one or more candidate precoding matrices associated with the second UE; and
- transmit, via the transceiver, the channel state information in accordance with the reporting configuration.

30. An apparatus for wireless communication, comprising:
- memory; and
- at least one processor of a network entity, the at least one processor coupled with the memory, and the at least one processor configured to:
  - output a control message that indicates a reporting configuration for indicating channel state information, wherein the channel state information is associated with a channel between a first user equipment (UE) and the network entity; and
  - obtain the channel state information in accordance with the reporting configuration, wherein the channel state information is based at least in part on both of at least one candidate precoding matrix of one or more candidate precoding matrices associated with uplink precoding at a second UE and at least one precoded cross link interference channel at the first UE associated with an uplink transmission associated with the second UE.

* * * * *